United States Patent
Kim et al.

(10) Patent No.: US 12,385,846 B2
(45) Date of Patent: Aug. 12, 2025

(54) DIGITAL IMAGE GEMSTONE VERIFICATION WITH FILTERS

(71) Applicant: Gemological Institute of America, Inc. (GIA), Carlsbad, CA (US)

(72) Inventors: Jongsik Kim, Carlsbad, CA (US); Sudhin Mandal, Carlsbad, CA (US)

(73) Assignee: Gemological Institute of America, Inc. (GIA), Carlsbad, CA (US)

(*) Notice: Subject to any disclaimer, the term of this patent is extended or adjusted under 35 U.S.C. 154(b) by 266 days.

(21) Appl. No.: 18/200,425

(22) Filed: May 22, 2023

(65) Prior Publication Data

US 2023/0408419 A1     Dec. 21, 2023

Related U.S. Application Data

(60) Provisional application No. 63/346,235, filed on May 26, 2022.

(51) Int. Cl.
| | | |
|---|---|---|
| *G01N 21/87* | (2006.01) | |
| *G06V 10/141* | (2022.01) | |
| *G06V 10/145* | (2022.01) | |
| *G06V 20/00* | (2022.01) | |
| *G06V 30/14* | (2022.01) | |

(52) U.S. Cl.
CPC ......... *G01N 21/87* (2013.01); *G06V 10/141* (2022.01); *G06V 10/145* (2022.01); *G06V 20/95* (2022.01); *G06V 30/1434* (2022.01)

(58) Field of Classification Search
CPC ............ G01N 21/8851; G01N 21/87; G01N 2021/8864; G01N 2021/8887; G06T 7/0002; G06T 7/0004; G06V 10/141; G06V 10/143; G06V 10/145; G06V 10/25; G06V 20/80; G06V 20/95; G06V 30/14; G06V 30/141; G06V 30/1431; G06V 30/1434; G06V 30/1444; G06V 30/1448

See application file for complete search history.

(56) References Cited

U.S. PATENT DOCUMENTS

| | | | |
|---|---|---|---|
| 2,157,437 A | 5/1939 | Shipley | |
| 4,648,717 A | 3/1987 | Ross et al. | |
| 5,124,935 A * | 6/1992 | Wallner | ........... G06V 20/66 347/225 |
| 5,828,405 A * | 10/1998 | Vanier | ............ G01N 33/389 348/161 |

(Continued)

FOREIGN PATENT DOCUMENTS

| | | |
|---|---|---|
| WO | 2016/127064 A1 | 8/2016 |
| WO | 2023/230007 A1 | 11/2023 |

OTHER PUBLICATIONS

Bromley, J., et al. (Aug. 1993) Signature verification using a "Siamese" time delay neural network. International Journal of Pattern Recognition and Artificial Intelligence, vol. 7, No. 4, pp. 669-688.

(Continued)

*Primary Examiner* — Gordon J Stock, Jr.
(74) *Attorney, Agent, or Firm* — DLA PIPER LLP (US); Blake W. Jackson; Thomas L. Fuller

(57) ABSTRACT

Systems and methods here may be used for capturing images of sample gemstones under structured, filtered illumination for later comparison and image matching for authentication using networked computer systems.

19 Claims, 25 Drawing Sheets

(56) References Cited

U.S. PATENT DOCUMENTS

| | | | |
|---|---|---|---|
| 5,932,119 A * | 8/1999 | Kaplan | B23K 26/0643 |
| | | | 219/121.68 |
| 5,966,673 A * | 10/1999 | Shannon, Sr. | G01N 21/87 |
| | | | 356/30 |
| 7,239,739 B2 * | 7/2007 | Lapa | G01N 33/389 |
| | | | 382/141 |
| 7,768,656 B2 | 8/2010 | Lapa et al. | |
| 7,834,987 B2 * | 11/2010 | Reinitz | G06Q 30/0278 |
| | | | 356/31 |
| 8,270,719 B2 * | 9/2012 | Ellawand | G01N 21/41 |
| | | | 356/30 |
| 9,678,018 B2 * | 6/2017 | Takahashi | G01N 21/87 |
| 10,489,647 B2 * | 11/2019 | Schaefer | G06V 20/66 |
| 10,552,950 B2 * | 2/2020 | Balagurusamy | G06T 7/55 |
| 10,733,615 B2 * | 8/2020 | Koh | G01N 33/389 |
| 11,232,553 B2 * | 1/2022 | Parikh | G06T 7/0002 |
| 11,428,641 B2 * | 8/2022 | Gajjar | G01N 21/87 |
| 11,796,480 B2 * | 10/2023 | Navot | G06F 18/2413 |
| 11,867,637 B2 * | 1/2024 | Hakim | G06K 19/06037 |
| 11,892,405 B2 * | 2/2024 | Takahashi | G01N 21/6456 |
| 12,072,295 B1 * | 8/2024 | Henley | G01N 21/87 |
| 2010/0092067 A1 | 4/2010 | Ellawand | |
| 2014/0139608 A1 | 5/2014 | Rosario et al. | |
| 2016/0232432 A1 * | 8/2016 | Regev | G06V 20/647 |
| 2017/0241913 A1 * | 8/2017 | Gu | G01N 21/87 |
| 2019/0366475 A1 | 12/2019 | Scarselli et al. | |
| 2020/0340927 A1 | 10/2020 | Balagurusamy et al. | |
| 2021/0201461 A1 | 7/2021 | Parikh | |
| 2023/0228690 A1 * | 7/2023 | Tsai | G01N 21/87 |
| | | | 356/237.2 |

OTHER PUBLICATIONS

Fei-Fei, L., et al. (Apr. 2006) "One-Shot learning of object categories". IEEE Transactions on Pattern Analysis and Machine Intelligence, vol. 28, No. 4, pp. 594-611.

Ronneberger O., et al. (2015) U-Net: Convolutional Networks for Biomedical Image Segmentation. In: Navab N., Hornegger J., Wells W., Frangi A. (eds) Medical Image Computing and Computer-Assisted Intervention—MICCAI 2015. MICCAI 2015. Lecture Notes in Computer Science, vol. 9351. Springer, Cham.

Blatt, Todd J., "Analytics: Business Intelligence, Algorithms and Statistical Analysis," Jul. 31, 2017.

* cited by examiner

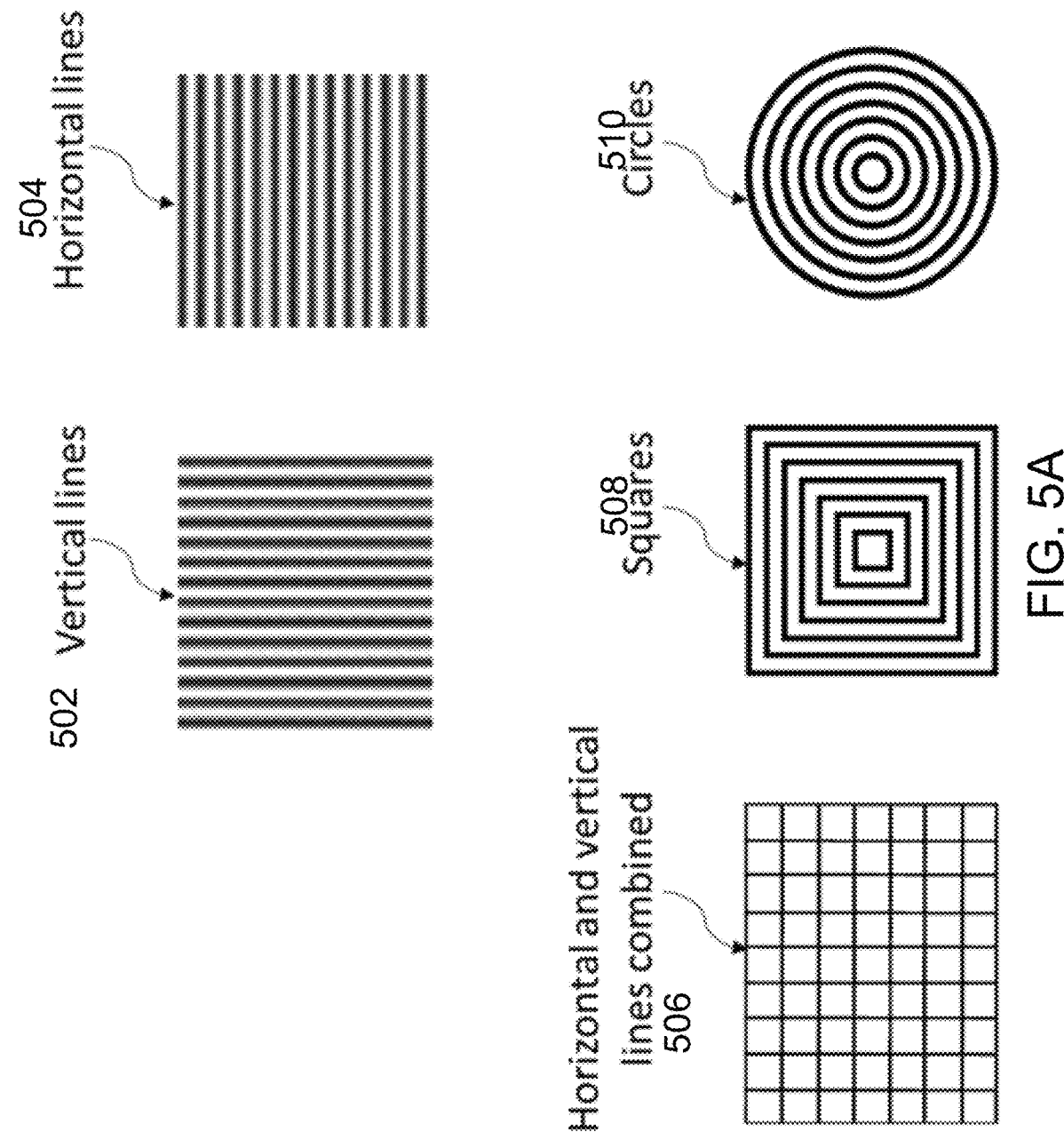

DIGITAL IMAGE GEMSTONE VERIFICATION WITH FILTERS

CROSS-REFERENCE TO RELATED APPLICATION(S)

The present application claims priority to U.S. Provisional Patent Application No. 63/346,235 filed on May 26, 2022, the entirety of which is incorporated by reference herein.

FIELD

The field includes software for creating difficult to counterfeit inscriptions and matching images of laser inscriptions on gemstones including using filters for image capture.

BACKGROUND

Marking gemstones with permanent inscriptions, etchings, and/or engravings have been used to help identify stones and apply logos. However, it is possible for third parties to counterfeit a laser engraving number in order to take advantage of the relationship that one marking may have with a report, grade, or other identifying information. These drawbacks require new and improved systems and methods, described herein, for creating inscriptions that are difficult to counterfeit and also matching a gemstone image when it was graded to when it is subsequently submitted.

SUMMARY

Systems and methods here may be used to match identifications in gemstones using image matching and machine learning, artificial intelligence systems and methods. In a first example embodiment, a method is provided. The method can be performed by a computer with a processor and memory. The computer can be in communication with a networked comparison server computer, a digital camera and a structured, filtered light source. The method can include causing the light source illuminate gemstone in a holder. The gemstone can include an inscription. Further, the light source can include a structured filter.

The method can also include, by the computer, receiving a digital image of the gemstone and at least one identifier for the gemstone. The method can also include by the computer, retrieving at least one previously stored digital image and its identifier using the received identifier. The previously stored image and its identifiers can include an inscription on a gemstone and its unique features. The method can also include by the computer, comparing the received digital image of the gemstone and/or identifiers with the at least one previously stored digital image retrieved using the identifier(s). The comparing the received digital image of the gemstone and/or identifier(s) with the at least one previously stored digital image can be retrieved using the identifier(s).

If the comparison matches, the method can include indicating to a user interface, a match. If the comparison does not match, the method can include indicating to a user interface, no match.

In another example embodiment, a system is provided. The system can include a digital camera and a structured, filtered light source. The light source can include a light source filter. The system can also include a computer comprising a processor and a memory. The memory can include instructions to cause the processor to cause the light source illuminate gemstone in a holder. The gemstone can include an inscription.

The instructions can further cause the processor to receive a digital image of the gemstone and at least one identifier for the gemstone. The digital image can be captured by the digital camera. The instructions can further cause the processor to retrieve at least one previously stored digital image and its identifier using the received identifier. The previously stored image and its identifiers can include an inscription on a gemstone and its unique features.

The instructions can further cause the processor to compare the received digital image of the gemstone and/or identifiers with the at least one previously stored digital image retrieved using the identifier(s). The comparing the received digital image of the gemstone and/or identifier(s) with the at least one previously stored digital image can be retrieved using the identifier(s).

If the comparison matches, the instructions can further cause the processor to indicate to a user interface, a match. If the comparison does not match, the instructions can further cause the processor to indicate to the user interface, no match.

In another example embodiment, a computer-implemented method is provided. The computer-implemented method can include receiving a digital image of the gemstone and at least one identifier for the gemstone.

The computer-implemented method can also include retrieving at least one previously stored digital image and its identifier using the received identifier. The previously stored image and its identifiers can include an inscription on a gemstone and its unique features.

The computer-implemented method can also include comparing the received digital image of the gemstone and/or identifiers with the at least one previously stored digital image retrieved using the identifier(s). The comparing the received digital image of the gemstone and/or identifier(s) with the at least one previously stored digital image can be retrieved using the identifier(s).

If the comparison matches, the computer-implemented method can include indicating to a user interface, a match. If the comparison does not match, the computer-implemented method can include indicating to a user interface, no match.

The computer-implemented method can be performed by a computer. The computer can be in communication with a networked comparison server computer. The computer can further be in communication with a digital camera and a structured, filtered light source. In some instances, the computer-implemented method can include causing the light source illuminate gemstone in a holder. The gemstone can include an inscription. Further, the light source can include a structured filter.

In some instances, the light source filter is a horizontal filter. In some instances, the light source filter is a vertical filter. In some instances, the light source filter is a grid filter. In some instances, the light source filter is a circular filter. In some instances, the light source filter is a square filter. In some instances, the light source filter is in a particular shape correlated to a geometry of the gemstone.

In some instances, the structured, filtered light source includes lines with spacing and size and linewidth that is proportional to at least one of, a distance between the structured, filtered light source to the gemstone, a diameter of the gemstone, a spatial distance between facet junctions of the gemstone, and a height of the gemstone.

In some instances, the structured, filtered light source is an optical display/projector/monitor/LEDs.

In some instances, the digital camera and the light source are desk top units which are remote from the computer used for comparing with previously stored images.

In some instances, the digital camera and the structured, filtered light source are in a same mobile unit which are remote from the computer used for comparing with previously stored images.

In some instances, the digital camera and light source are directed along a same axis to the gemstone by a dichroic beam splitter.

In some instances, the digital camera and light source are directed at opposite sides of the gemstone to provide a back light image.

In some instances, the comparing the received digital image of the gemstone and/or identifier(s) with the at least one previously stored digital image retrieved using the identifier(s), includes comparing gemstone girdle profile in the images.

In some instances, the comparing the previously stored digital image of the gemstone and/or identifier(s) can be replaced with a newly acquired digital image of the same gemstone and/or identifier(s).

In some instances, the matching server generates a digital certificate/record of gemstone after a successful matching and the resulting digital certificate/record can be provided to a user(s).

In some instances, a thickness of lines in the structured, filtered light can be vary from 1 nm to 100 mm and a spacing of lines in the structured, filtered light can be vary from 1 nm to 100 mm.

In some instances, lines in the structured, filtered light have a sinusoidal gradation.

In some instances, lines in the structured, filtered light are binary without gradation.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

FIGS. 5A and 5B are illustrations of an example optical filter arrangement using certain aspects described herein;

DETAILED DESCRIPTION

Figure 1:
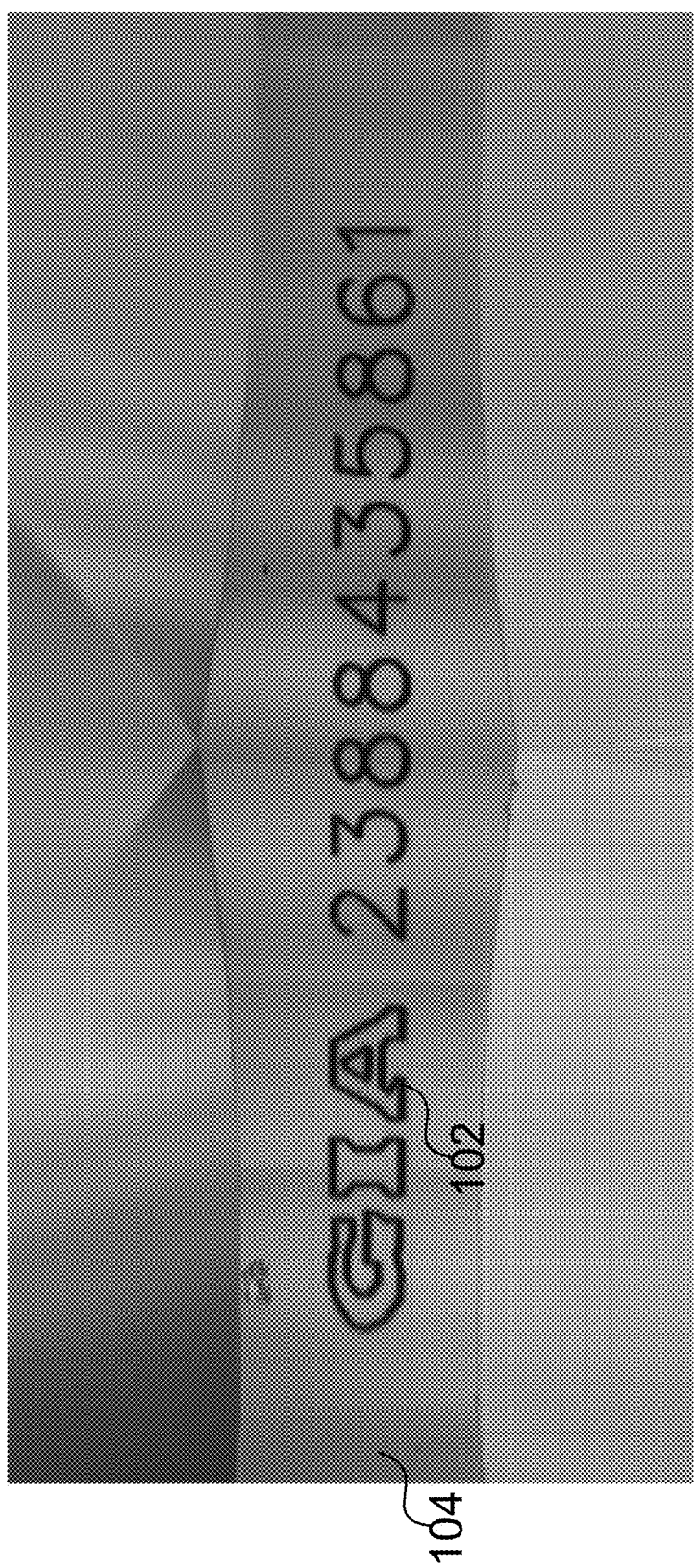
FIG. 1 is an illustration of an example inscription using certain aspects described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Gemstones are difficult to value, but analysis and certification from a reputable institution such as the Gemological Institute of America (GIA) and/or the European Gemological Laboratory (EGL) may allow the market to better understand the gemstones and the underlying physical properties of them to assign values. In such examples, gemstones may be submitted for analysis which is memorialized in a certificate for each gemstone with a full description including authenticity, size, shape, grading, properties, and/or record number for database and reference. Once a gemstone is certified, its record including all the above mentioned description may be stored for later use.

It is also possible that a gemstone certificate can be re-issued up on customer's request. In general, customer gemstones, which are previously certified by an established organization, should be mailed to the same organization for a new certificate. This gemstone certification process is very time consuming and expansive to customer. Occasionally, customer's gemstone can be lost during shipment. Therefore, it is very natural to envision a gemstone certificate and/or verification service, which certifies a gemstone automatically with the help of the computerized gemstone verification method mentioned above.

And it may also be beneficial to label gemstones with permanent markings such as ablations, engravings, and/or inscriptions of identifiers in order to track and later match such gemstones. Such an identifier can be any kind of information such as but not limited to meta data such as a record number (or inscription), gemstone color, shape, color, cut, carat weight, clarity, origin, location of inclusions, cut type, and/or girdle polish type, etc. in any combination or permutation. Such identifying markings may also be tied to a report, grade, origin information, or other background information in a background database for lookup and later matching and identification purposes. Additionally, gemstone labelling can be done in many different forms such as barcode, unique number, unique shape, etc. But gemstones like anything else, are moved around, sent in the mail, and sold to different parties. Verification of previously certified and/or analyzed gemstones is therefore useful and desirable.

However, counterfeiters may benefit from inscribing their own fake identifiers to mimic authentic inscriptions. Therefore, making inscriptions more difficult to counterfeit may be useful. Additionally, an image matching system may be useful in order to identify such faked or counterfeit inscriptions as compared to previously identified and analyzed gemstones stored in a reference database. Further, it may be useful to complete such verifications at remote locations from the location of the references storage for ease of use and access to the matching results. In such a way, a consumer may be able to image a gemstone at a mall, send the image or images by computer network to the systems described here for matching, and receive a result of the matching in relatively short time. In such a way, systems and methods here may be used for matching images of laser inscriptions on gemstones including but not limited to inscriptions on gemstones including on often inscribed gemstone girdles.

Although examples of gemstones and engraved gemstones are used in this description, such terms are not intended to be limiting. The systems and methods here may be used on many multiple example matching scenarios, gemstones with laser engravings is merely one.

Gemstone Inscription Background

Ablating gemstones with laser beams on the surface, and/or below the surface of gemstones may be used to mark and thereby later identify a gemstone correlated to a history, grade, origin, or other background information. Such inscription may be used to inscribe anything such as, but not limited to a number, word, logo, QR code, barcode, label, code, logo, secondary encryptions, and/or three dimensional images in the gemstone for labeling and/or identification purposes, as well as for customizing gemstones with customer requested names, dates, etc. Such inscriptions may be visible with the naked eye, or hard to see with a naked eye, but under magnification provide information that may be used for tracking and identifying gemstones. Such ablation inscriptions may be hard to change and/or mimic by third parties, especially those under the surface. But because the identifying mark may be tied to a grade or report or chain-of-title, sales history, and/or other background information, and such mark may be counterfeited, faked, or forged, it is beneficial to help ensure that the inscription on a particular stone matches the inscription tied to the original and authentic grade or report stored in the background system. In such a way, an image of an inscribed gemstone report may be more closely matched and verified than by using the bare inscription characters to match.

Figure 2:
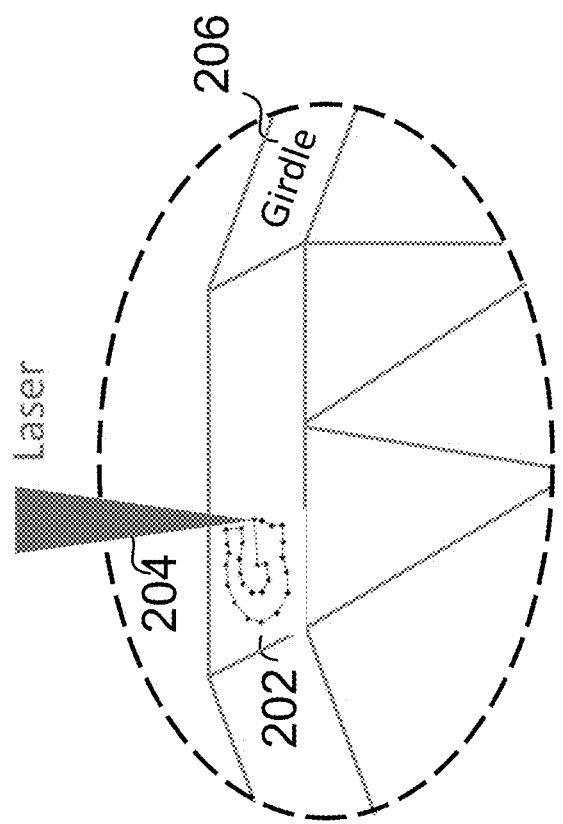
FIG. 2 is an illustration of an example inscription arrangement using certain aspects described herein.

FIG. 1 shows an inscription 102 on a girdle of a cut diamond, however, such inscriptions may be made in any location on a cut diamond, the girdle example being non-limiting. FIG. 2 shows an example of a laser beam 204 focusing energy on the girdle 206 of a gemstone and ablating the gemstone one spot or point 202 at a time, according to instructions provided by and to the computer software in communication with the hardware laser system in order to create the required or requested inscriptions. Such an identifier may be matched to a background history, grade, origin, or other information for matching and informational purposes. Any such inscription design may be made, however, it is possible that a third party might inscribe another gemstone with the same identifier, trying to mimic the original.

Figure 3:
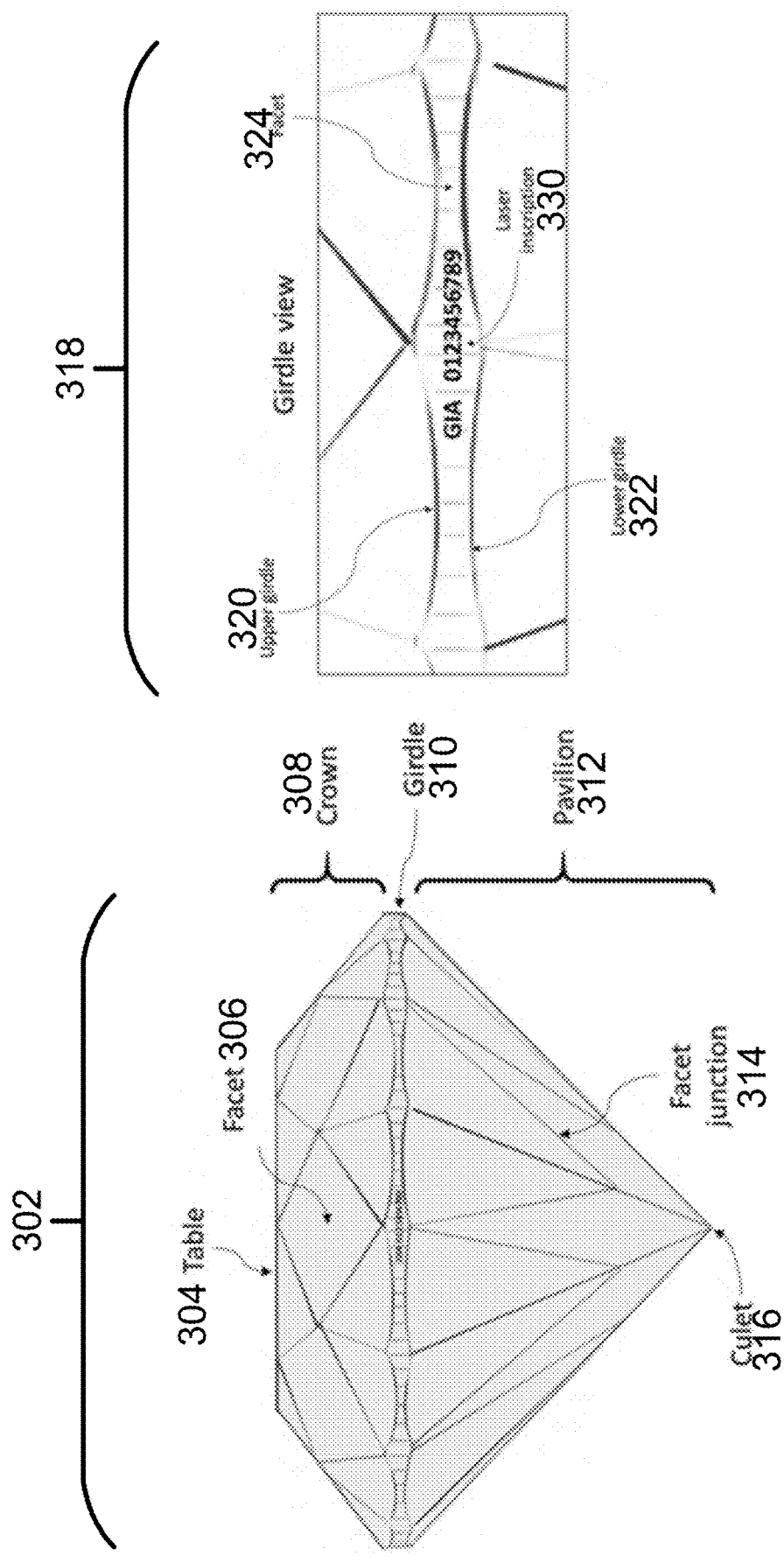
FIG. 3 is another illustration of an example inscription arrangement using certain aspects described herein.

FIG. 3 shows the example gemstone 302 and detail of a girdle with inscription 318. The diagram of the gemstone 302 shows a table 304, facets 306 on the crown 308, and the girdle 310. The girdle section 310 is often, but not always, the place where gemstones are inscribed, especially in a round, brilliant style cut. The pavilion 312, facet junctions 314 on the pavilion 312 terminating in the culet 316 are also shown.

The detail 318 of the girdle is also shown with the upper girdle 320, and lower girdle 322 bounding the facets 324 used in cut the girdle section where the laser inscription 330 is located. In some examples, the girdle facets with vertical oriented facets 324 are not used but rough or polished, the faceted girdle is shown only as an example as it is common.

The systems and methods here use other identifying features of the gemstone itself to aid in matching not only the images or designs etched into the gemstone.

Imaging Filter Examples

Figure 4:
FIG. 4 is an illustration of images of example inscription arrangements using certain aspects described herein.
Figure 4:
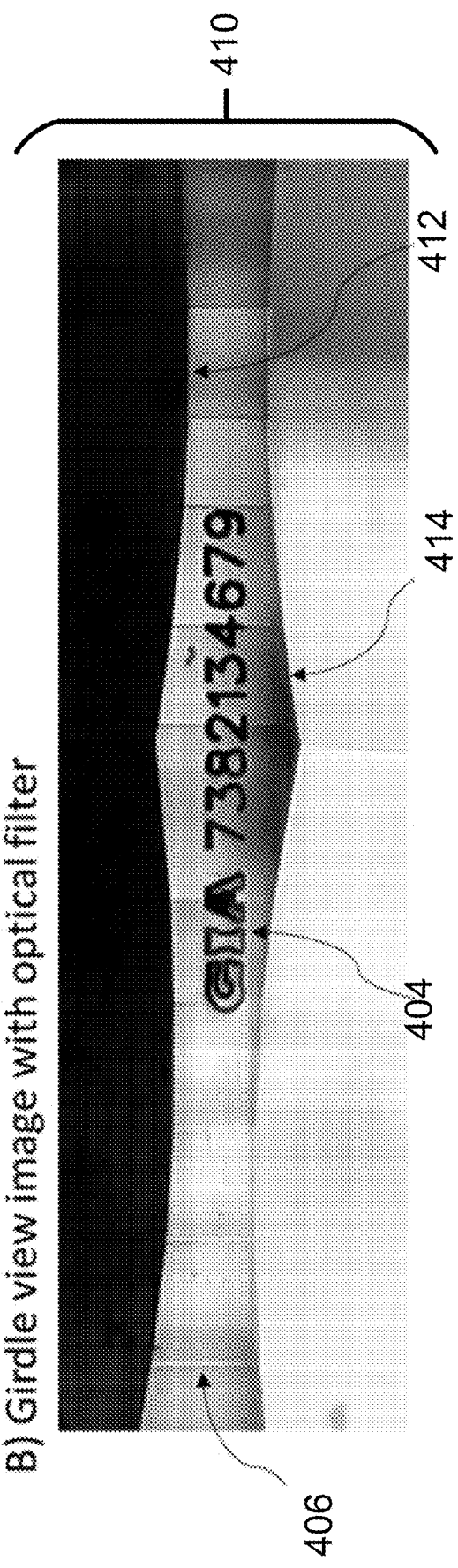

FIG. 4 shows the girdle example comparison without 402 and with 410 and optical filter applied to the camera as described herein. The figures show how and why images taken with optical filters are easier to process using computer image analysis, pixel analysis and software to identify not only the inscriptions, but the other physical aspects of the diamond for computer image analysis. Contrast may be increased in images taken with filters and thereby aid the computer image analysis in order to decipher any of the features including inscriptions on the samples as well as facets, facet angles, facet junctions, and other physical properties.

Without the optical filter 402, facet junctions 406 are barely visible. However, the overall facet junction visibility gets dramatically improved with the images taken using an optical filter 410 as described herein. As can be seen with the filtered image 410 of the girdle and inscription 404, that the vertical facets 406 are more clear in the image taken with the filters 410. Also, the inscriptions are more clear 404 and the upper facet 412 and lower facet 414 junctions have better definition. Because the lines on the image taken with optical filters 410 are cleaner, clearer, better contrast and definition, computer digital image and pixel analysis may be aided and more accurate as described.

FIG. 5A shows examples of different optical filters in different orientations and patterns. Any or all of these patterned filters may be used in the embodiments described herein, in any combination with the camera used to capture images for analysis as described herein. In gemology, each of the 4Cs (Cut, Color, Clarity and Carat) play a role in determining a gemstone quality. For example, a diamond cut quality is commonly assessed by checking any oddness, irregularities, symmetry, etc. in table-up and table-down views. Therefore, it may be useful to enhance gemstone facets in digital images taken for grading purposes, especially by computer image analysis. Such filters may also be used to enhance the visibility of unique features of gemstones including facet junctions, any defects such as cracks, chips, scratches and/or inclusions.

FIG. 5A, shows example optical masking filter(s) used for gemstone imaging in a system with a complicated pattern, for example specific spacing and/or shape, which is highly correlated with any spatial frequency, for example orientation and/or shape, of a given gemstone. Once the optical pattern is projected to a given gemstone, it will optically interfere with the unique features of a given gemstone, resulting in visibility improvement of facet junctions and inclusions as shown herein, depending on the shape and pattern.

Figure 5B:
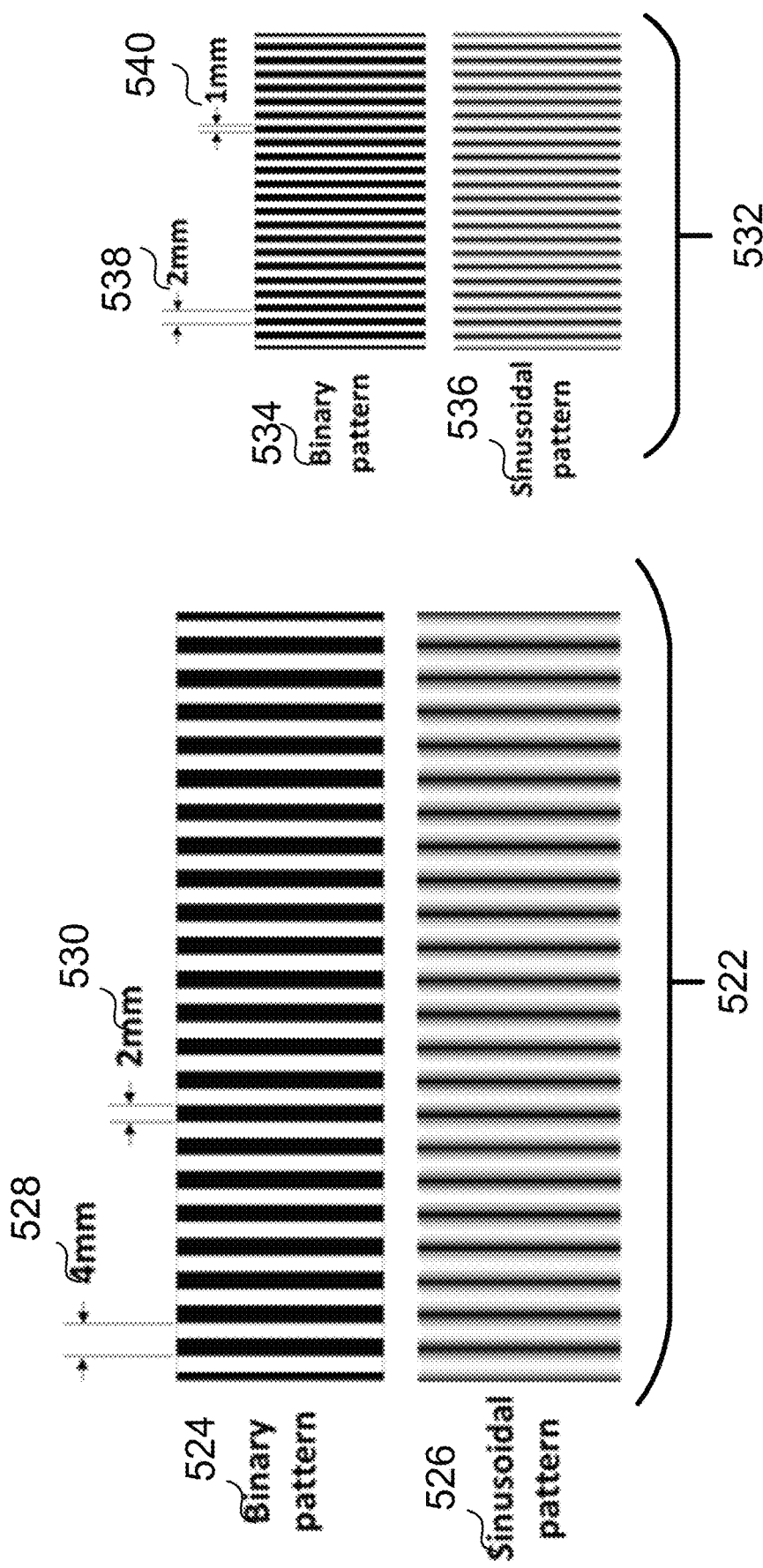

The spacing in filter can be vary from gemstone to gemstone and/or imaging device to device. Such different spacing of lines and thickness of lines may enhance different aspects of each gemstone facet, geometry, and/or engraved, etched, embossed, or inscribed identifier. In some examples, the spacing may be adjusted based on a few factors, including but not limited to, distance between filter to gemstone girdle, diameter of gemstone, spatial distance between facet junctions, and/or height of gemstone, in any combination or permutation. In some examples, this may drive an adjustment of the filter pattern as well as spacing and/or height for each gemstone. FIG. 5B shows example representatives of optical filter at different configuration. In the first example 522 of FIG. 5B, the binary pattern 524 and sinusoidal pattern 526 are shown. In the binary pattern 524, only white spaces and black lines are used with no gradation, with a distance between the first line and next line is 4 mm as an example. The sinusoidal pattern 526 include gradation of black to gray to white and back again. The distance could be any distance, but 4 mm is shown as a non-limiting example. Next, the thickness of the line itself 530 is shown as 2 mm. Again, the thickness of the lines could be any distance, but 2 mm is shown as a non-limiting example. The second example 532 also shows a binary pattern 534 and a sinusoidal pattern 536 with the distance between the first line and second line in the binary pattern to be 2 mm as a non limiting example 538 and the thickness of the line being 1 mm in a non-limiting example 540.

The optical interference between facet junctions and the optical filter pattern can further be described by Moiré effect. According to this theory, it is possible to enhance (or modulate) a particular spatial frequency component when the projected optical pattern is optically convolved with the spatial frequency (e.g., facet junctions) on a given gemstone.

Therefore, the pattern of optical filter pattern including spacing and shape is highly correlated with the spatial frequency components of a given gemstone. For example, the square shape optical filter 508 in FIG. 5A is designed to enhance any vertical and horizontal facet junctions and inclusions within optical field of view. Purely vertical lined filters 502 may enhance vertical lines such as those on a faceted girdle. Purely horizontal lines 504 may enhance horizontal lines such as certain facets around the crown. A combination of horizontal and vertical lines combined 506 may enhance both vertical and horizontal facets on a gemstone.

The circle shape optical filter 510 on FIG. 5A is designed to enhance facet junctions and inclusions on a round brilliant cut (RBC) gemstone. There are many different types of gemstone cuts such as round, emerald, princess, oval, radiant, etc. but a round brilliant cut is very common in diamond.

Imaging Hardware Setup Examples

Figure 6A:
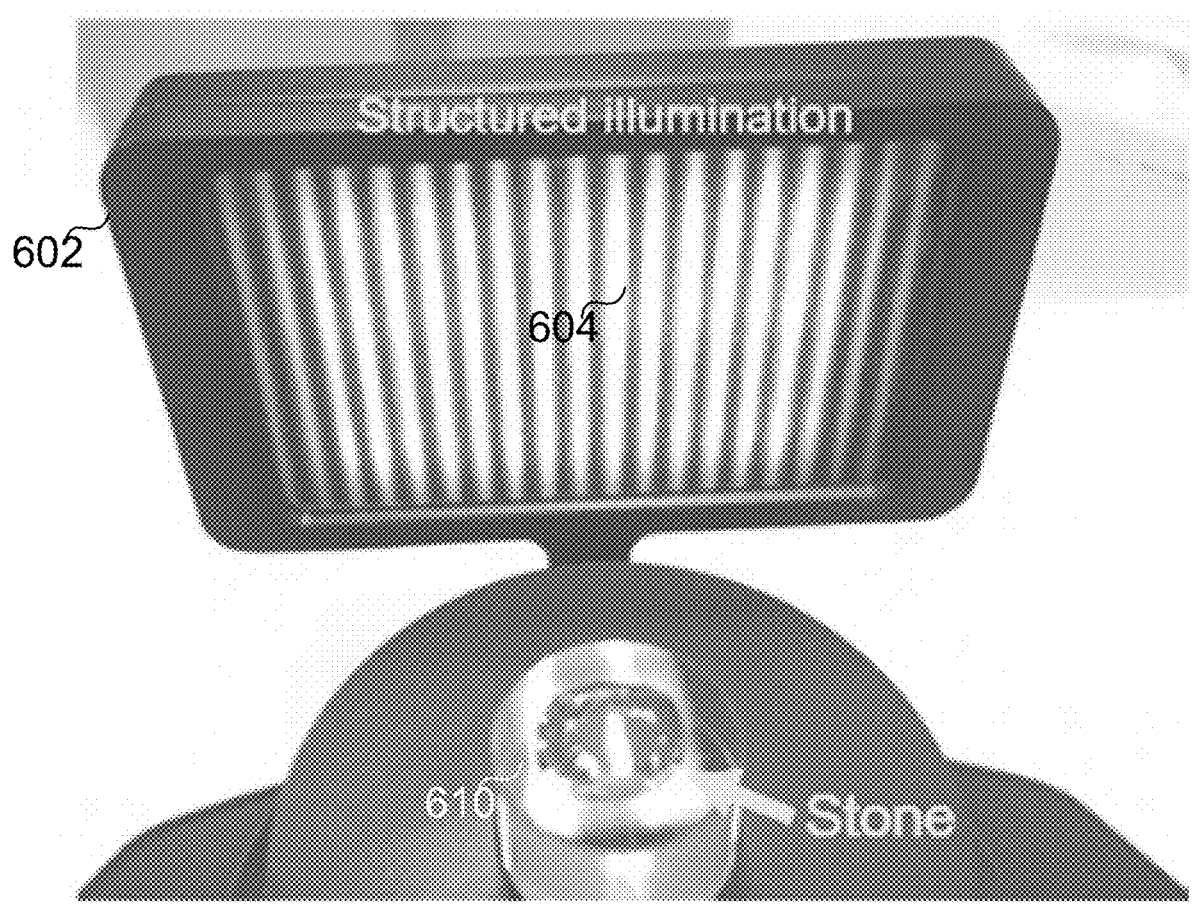
FIGS. 6A and 6B are illustrations of other examples of optical filter arrangement using certain aspects described herein.

FIG. 6A shows an example light source 602 with filter with lines 604 corresponding to the vertical lines of the griddle facets. Such a filter may correspond to the vertical lines shown in FIG. 5A as 502, or be arranged with any kind of filter. Such a unit as shown in FIG. 6A may be deployed remotely and include communication systems to not only illuminate a sample but also capture images and send those images to a back-end system for analysis. (See FIG. 19 for networked system and 20 for computing systems that may be integrated with or communicate with the systems in FIG. 6A.) FIG. 6A also shows a sample holder 610 which may be used for imaging. The camera is not shown in FIG. 6A but may be positioned to capture images of the sample from any of various angles.

As the benefits of using such filters are shown here, and the various filters that may be used, below are hardware setups that may be used to implement the described filters and capture images of gemstones for grading and/or other image analysis such as but not limited to comparisons for identification purposes.

As described, during the process of inscribing a gemstone with a unique identifier that is correlated to a gemstone report, an image may be taken of the inscription on the gemstone. Such image may be of the inscription and surrounding environment such as the girdle and facets above and below the inscription. The image may include facets of the girdle itself, and the facets of the gemstone near or touching the girdle, and any imperfections found near the inscription.

Figure 6B:
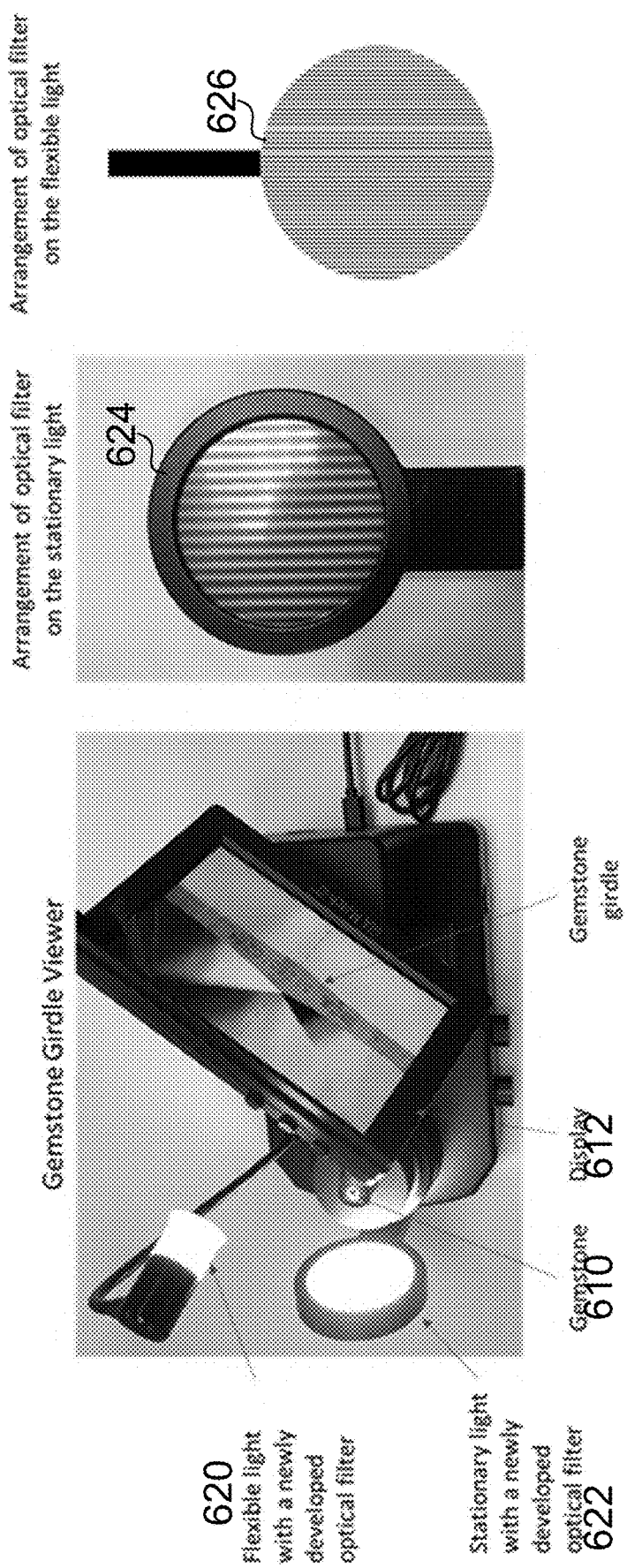

FIG. 6B shows another illustration of the imaging and lighting system including a gemstone holder 610 and a display 612. The example in FIG. 6B shows a light source attached to a flexible arm 620, in this example, with an optical filter as described herein. The example of FIG. 6B also shows a stationary light source 622 also with an optical filter as described herein. Both the light sources 620, 622 are able to illuminate the gemstone stage 610 and thereby any gemstone samples placed or held thereon. The camera (not shown) is positioned to capture images of the gemstone on the holder stage 610 and display the images on the display screen 612. In some examples, these images may be captured, stored, and/or sent to a back-end server as described for storage and/or comparison matching. The FIG. 6B also shows a detail of the optical filter on the stationary light 624 and optical filter on the flexible light 626. Any kind of filter arrangement could be employed on the stationary light 622 and/or flexible light 620 in any combination or permutation as described herein including but not limited to those described in FIG. 5A and FIG. 5B.

Figure 7:
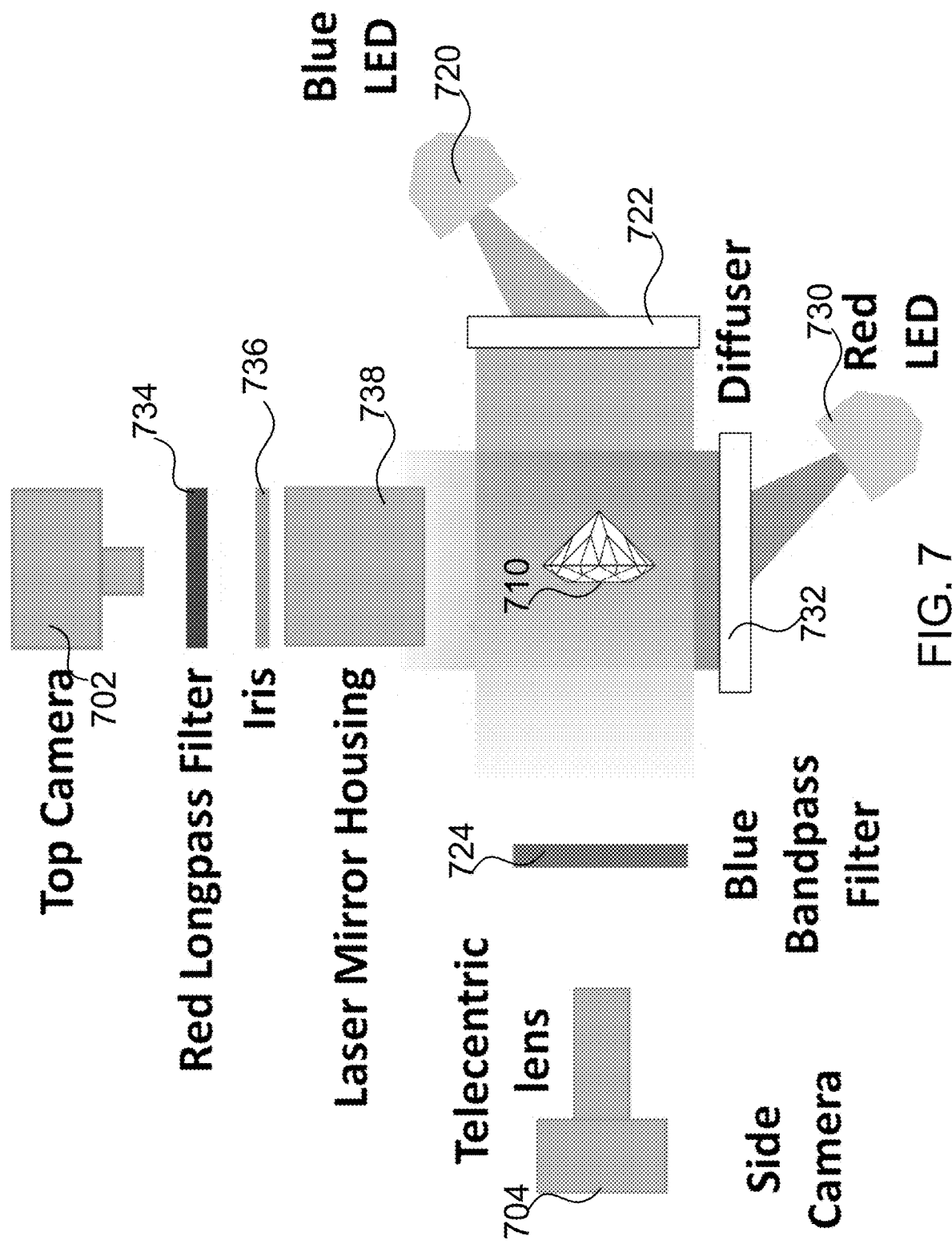
FIG. 7 is an illustration of an example system with certain aspects described herein.

FIG. 7 shows an example hardware abstract of the equipment which may be utilized to employ the methods described herein. This setup allows the system to capture and analyze two images of the gemstone: a top-view and a side-view image of the target gemstone. The side-view image would capture a profile of the diamond girdle, although any portion of a stone may be inscribed, the girdle being only a non-limiting example.

The Example of FIG. 7 includes a top camera 702 and side camera 704 (with optional telecentric lens) which may be used to line up the stone 710 with illumination of the stone coming from a Blue light emitting diode (LED) 720 and Red LED 730, each behind a respective diffuser, one for the blue light 722 and one for the red light 732 aimed at the gemstone 710. By illuminating a gemstone from the back and bottom angles as shown, the stone girdle image is more easily analyzed by the camera and computer systems for more precise inscriptions.

In the example of FIG. 7, a red long pass filter 734 is used between the stone 710 and top camera 702. In the example, an iris 736 is used between the stone 710 and top camera 702. In the example, a laser mirror housing 738 is arranged above the stone. In the example a blue band pass filter 724 is arranged between the stone 710 and side camera 704.

The components in FIG. 7 that may include internal computer systems or be in communication with computer systems that include but are not limited to, the top camera 702, side camera 704, iris 736, and laser mirror housing 738 as well as motors holding the stone 710 and/or stone holder. Such systems may be used to automatically focus the systems as described herein with feedback loops of images sent to the computer to make adjustments to the motors to move the holder and gemstone as described herein.

Separate blue 720 and red 730 LED light may be used to illuminate the stone 710 for inscribing by inserting different color filters 724, 734 for top 702 and side 704 camera. Lens coupled with the side camera 704 may be used to provide a clear image of the stone 710 girdle, should that be the part of the stone that is inscribed. Utilizing an iris 736 before the top camera 702 as shown in FIG. 7 to clip reflected side light may help increase the depth of view.

In some examples, any or all of the diffusers shown in FIG. 7, 722, 732 with the lights 720, 730 may be structured filters as described herein and shown as examples in FIGS. 5A-5B and FIGS. 6A-6B. In some examples, a combination of color red, blue or other color light as described, and structured filters may be used on the same camera.

Figure 19:
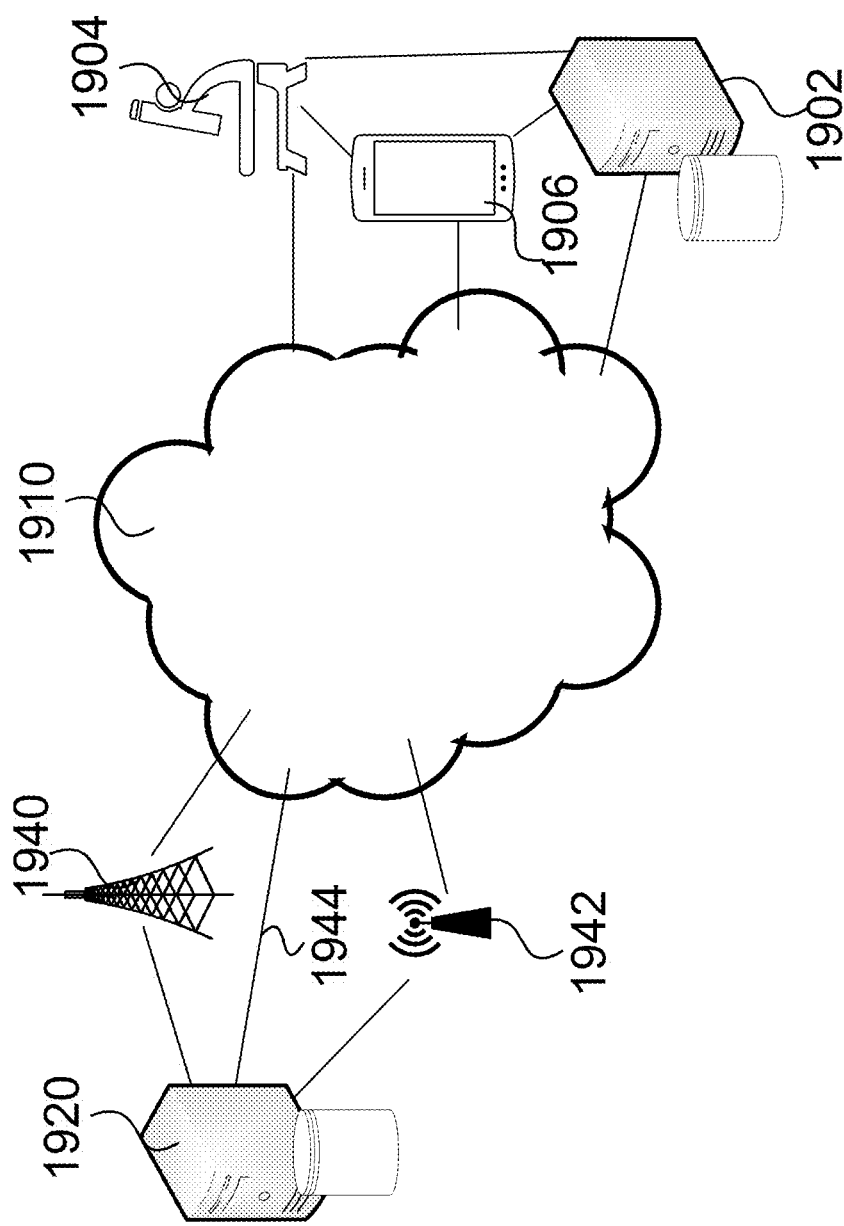
FIG. 19 is an illustration of an example networked system with certain aspects described herein.
Figure 20:
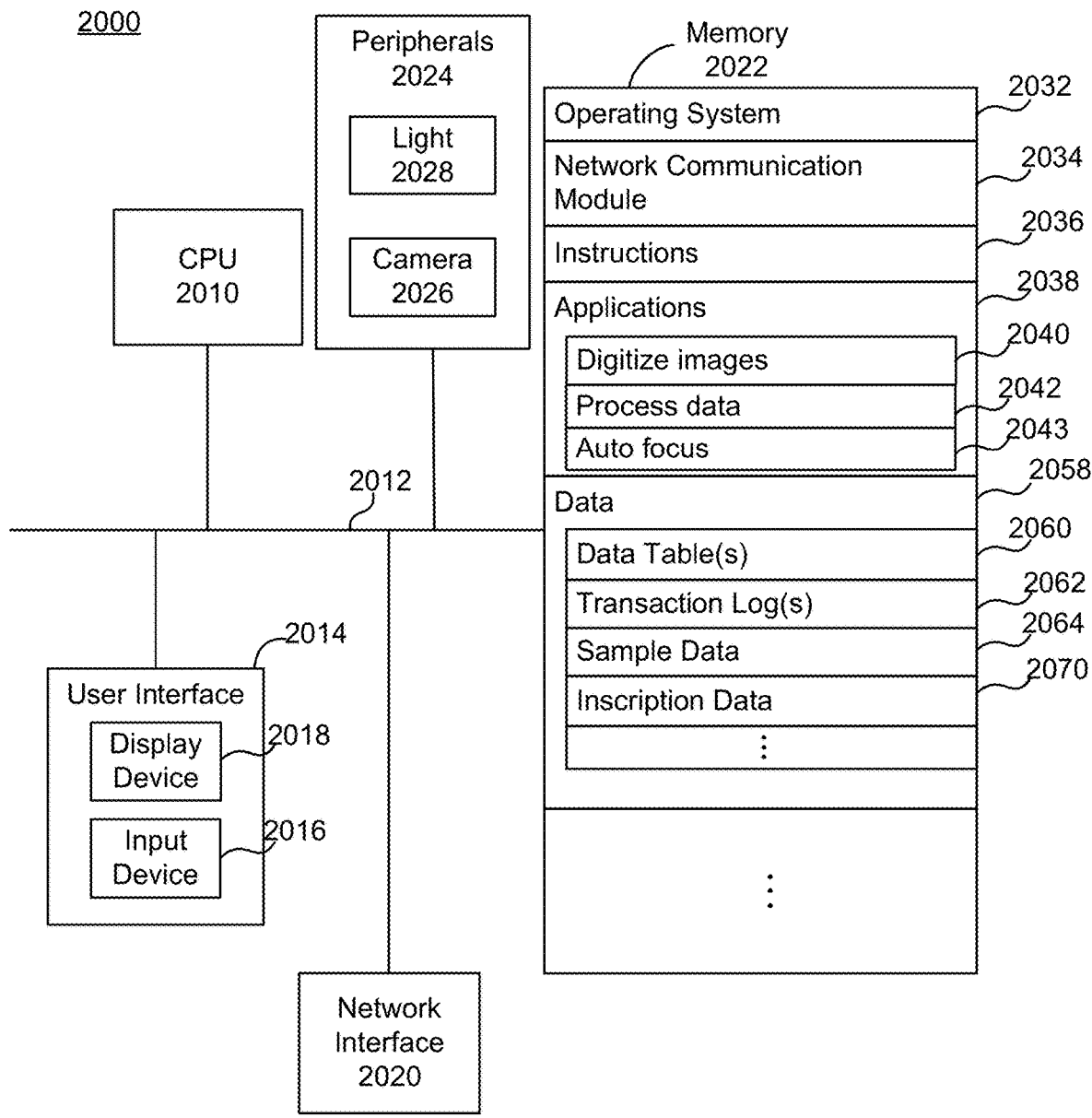
FIG. 20 is an illustration of an example computing system with certain aspects described herein.

Such imaging systems as described herein may include or be in communication with computer systems such as but not limited to those described in FIGS. 19 and 20. Such computer systems may be configured to control the laser parameters, cause movement by the various motors, and/or control capturing digital images to analyze for inscriptions. FIGS. 9, 10, 11, 12 and 13 show further examples below.

Gemstone Holder Examples

Figure 8:
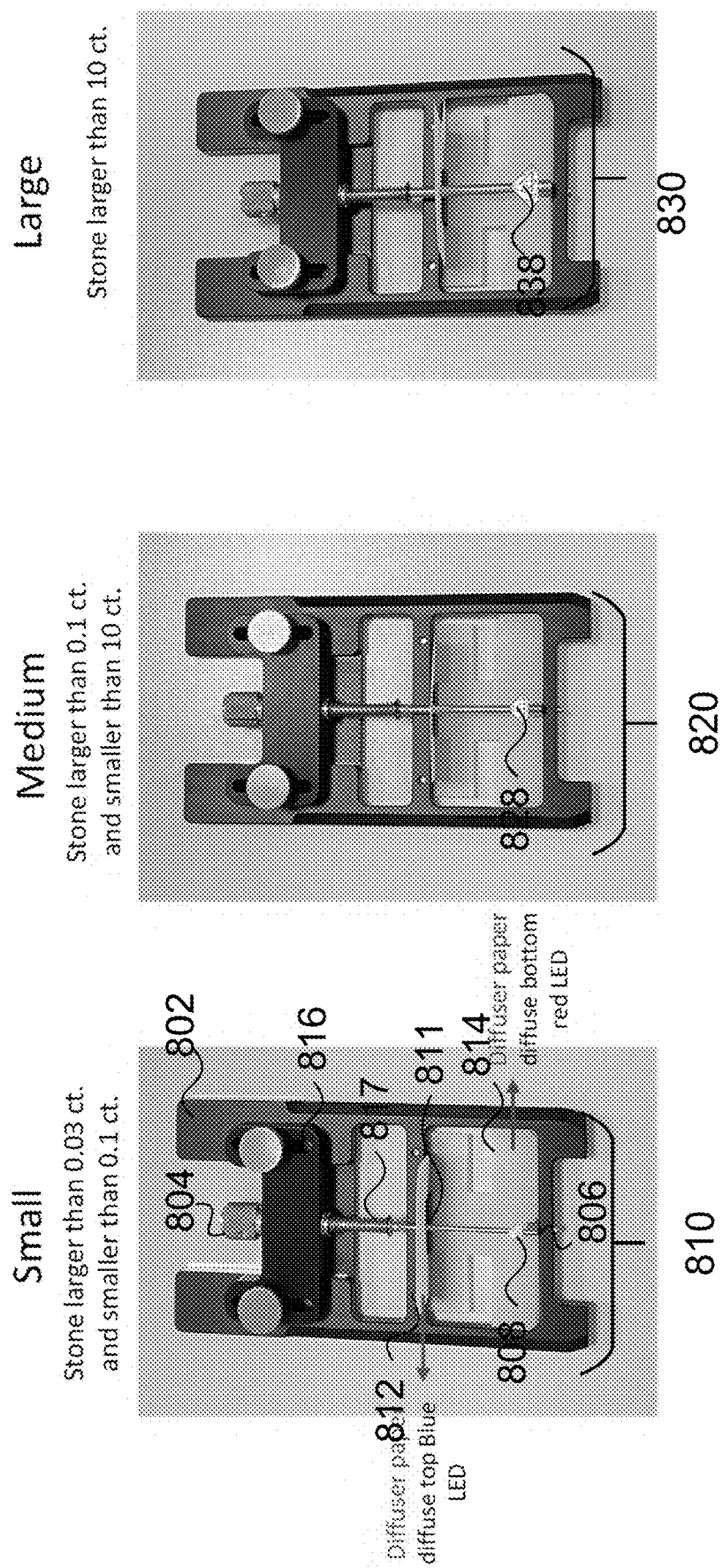
FIG. 8 is an illustration of example holders with certain aspects described herein.

In some examples, as shown in FIG. 8, a gemstone holder may be used to hold a gemstone for the laser to inscribe thereon, or images taken thereof. The example stone holder may be used to hold the stone to be inscribed in one place, to keep it from moving during an inscription process and allow an operator to more easily change the stones out from the inscription machine, if multiple stones are already loaded into holders, or stones are swapped out in one holder in rapid succession. Such a holder may also more easily include identifying information for the stone, so that the operator can keep track of which stones to load and inscribe with which indicia.

The holder includes a frame 802 with a spring-loaded shaft 804 mounted generally parallel to two of the four sides of the frame, and a fixed end 806 opposite the spring loaded shaft 804. Some examples include a thrust ball bearing and a thrust washer on both side of the spring 817 to facilitate the rotation of the spring-loaded shaft 804 and prevent torsional resistance. The example spring loaded shaft 804 may be pulled open by an operator to move the spring-loaded shaft 804 relative to the holder frame 802 and released to pinch a sample stone 808 between it and a fixed end 806, held by the spring tension of the spring 817 which is biased to push out and away from the top guide set 816. In the example, the holder includes a top guide set 816 through which the spring loaded shaft runs, with an opening to allow movement or sliding of the spring loaded shaft, for the spring 817 to push out and away from to impart the force of the spring loaded shaft 804 on the gemstone 808 and includes two guide slots and pegs to keep the spring loaded shaft aligned with the fixed end 806 as it opens and closes. The sample stone 808 may be placed on the holder and pinched between the spring-loaded shaft 804 and fixed end 806 as the spring loaded shaft 804 is pushes away from the top guide set 816 by spring tension.

FIG. 8 shows the holder securing three different sized stones, small stone 806 at 810, medium stone 828 at 820 and larger stone 838 at 830, as the shafts are relatively small, medium and large to fit the stones. In some examples, a small shaft may be used to hold stones between 0.03 carat and −0.1 carat, the medium shaft may be used to hold stones larger than 0.1 carat and smaller than 10 carats, and the larger shaft may be used to hold stones larger than 10 carats in size. This shows how the same arrangement may secure many sizes of gemstone for analysis. Such a stone holder is useful for inscribing many different parts of a gemstone, but especially helpful for inscribing a girdle on a gemstone.

In some examples, such a holder not only pinches the stone 808 between the spring-loaded shaft 808 and the fixed end 806, but may also include a diffusers to diffuse light used to illuminate the gemstone during inscribing process. Diffusers may be added for both top and bottom LEDs which help provide uniform lightning environment and lead to better image quality.

In some examples, this may include a top blue LED diffuser paper 812. In the example of FIG. 8, the diffusers 812, 814 are paper diffusers but could be made of plastic, etched glass, or any other kind of diffuser. The example holder 802 includes a friction fit slot 811 for the top blue diffuser paper 812 to be secured. In some examples, the holder may include diffuser paper 814 to diffuse bottom red LED. Stone holders with different spring-loaded shaft 804 shaft sizes may be used to fit different stone sizes.

In use, the arrangement shown in FIG. 8 is then placed in the system, such that the blue LED light shines through the top diffuser paper 812 and the bottom red light shines through the bottom diffuser paper 814 leaving the stone 808 open for the cameras to view from the top and side as shown in FIG. 7 and the laser to inscribe.

In some examples, the gemstone holder 810 may be placed into the inscription system and moved by the motors to allow the laser to inscribe where a software program has directed it. In such examples, a set of stepper motors or electric motors may be used to move the holder and gemstone in the x, y, and z directions while the laser system stays stationary to fire into the stone when the computer commands it to. The same arrangement may be used in the systems and methods described here for imaging a sample stone.

Imaging Systems Examples

Figure 9:
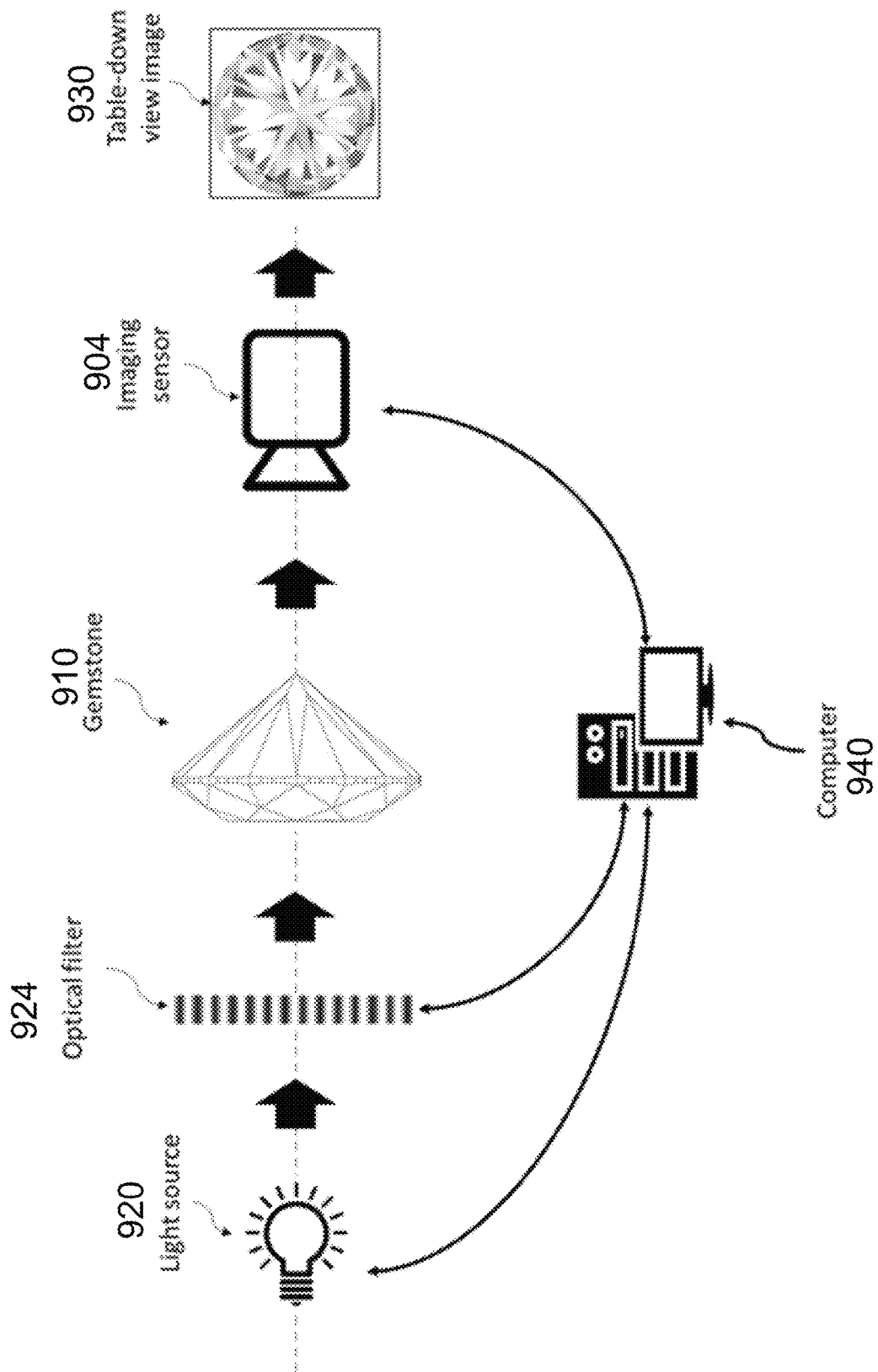
FIG. 9 is an illustration of an example hardware arrangements using certain aspects described herein.

FIG. 9 shows an example schematic of a transmission mode gemstone imaging system configured to verify a gemstone at table-down view, from the culet side.

In the example, the light source 920 includes an optical filter 924 as described herein. The gemstone being imaged 910 has the table side toward the light 920 and culet side toward the imaging sensor 904 or digital camera. In such a way, the computer system 940 (also described in FIGS. 19 and 20) may be in communication with the light 920, optical filter 924 display to change displays, and digital camera 904 and can control all aspects of the imaging process, including but not limited to light on/off, light intensity 920, light color 920 light wavelengths 920, which optical filter is used 924, when the camera captures an image 904, how many images are captured by the camera 904, etc.

The ultimate image captured in this arrangement of FIG. 9 is a table down image 930 but the orientation of the component parts such as the camera 904 and light 920 may be arranged in any way, as long as the order is kept. For example, the left to right orientation of the component parts is for example purposes only and could be up and down or any other orientation. The example orientation in FIG. 9 is not intended to be limiting.

In some examples, alone or in any combination, the pattern of optical filter can be dynamically and automatically adjusted for a given gemstone. In some examples, such changes are by liquid crystal display which may be changed or edited based on input from a computer system or manual entry of filter type, size, arrangement, spacing, or any other parameter. In some examples, Liquid Crystal Displays (LCD) may be used in conjunction with the light system and/or integrated into the light system in order to provide adaptable and/or dynamic structure to the lighting.

The correlation between the structured, filtered light options and the gemstone physical properties (height, facet dimensions, facet distances, and/or other geometry) may help enhance the contrast and thereby image quality for more accurate matching.

Systems may allow for manual input of these or other physical properties of the gemstone under evaluation, and/or the system may capture an image of the gemstone and thereby determine, based on known distances to camera lens, etc. to model or estimate some or all of the required geometrical measurements to be used. In an automatic arrangement, an image of the gemstone may be captured and analyzed by a back-end computer to determine which best-fit structured light source may be used to capture an enhanced image for comparison.

Once determined, either by manual or automatic determination based on image analysis, the system may direct the light source filter structure to display a particular pre-determined line spacing, thickness, arrangement, setting, pattern, and/or any other kind of arrangement. See FIGS. 5A and 5B for examples. The line spacing and thicknesses of any of the filter options shown may be selected, change, and updated for different lighting conditions and image capture to enhance facets, identifiers, and/or other features. Such a change may be implemented by LCD changes on the light and/or any other kind of changing, swapping, or moving of filters into position for the light source to illuminate the gemstone under evaluation.

Figure 10:
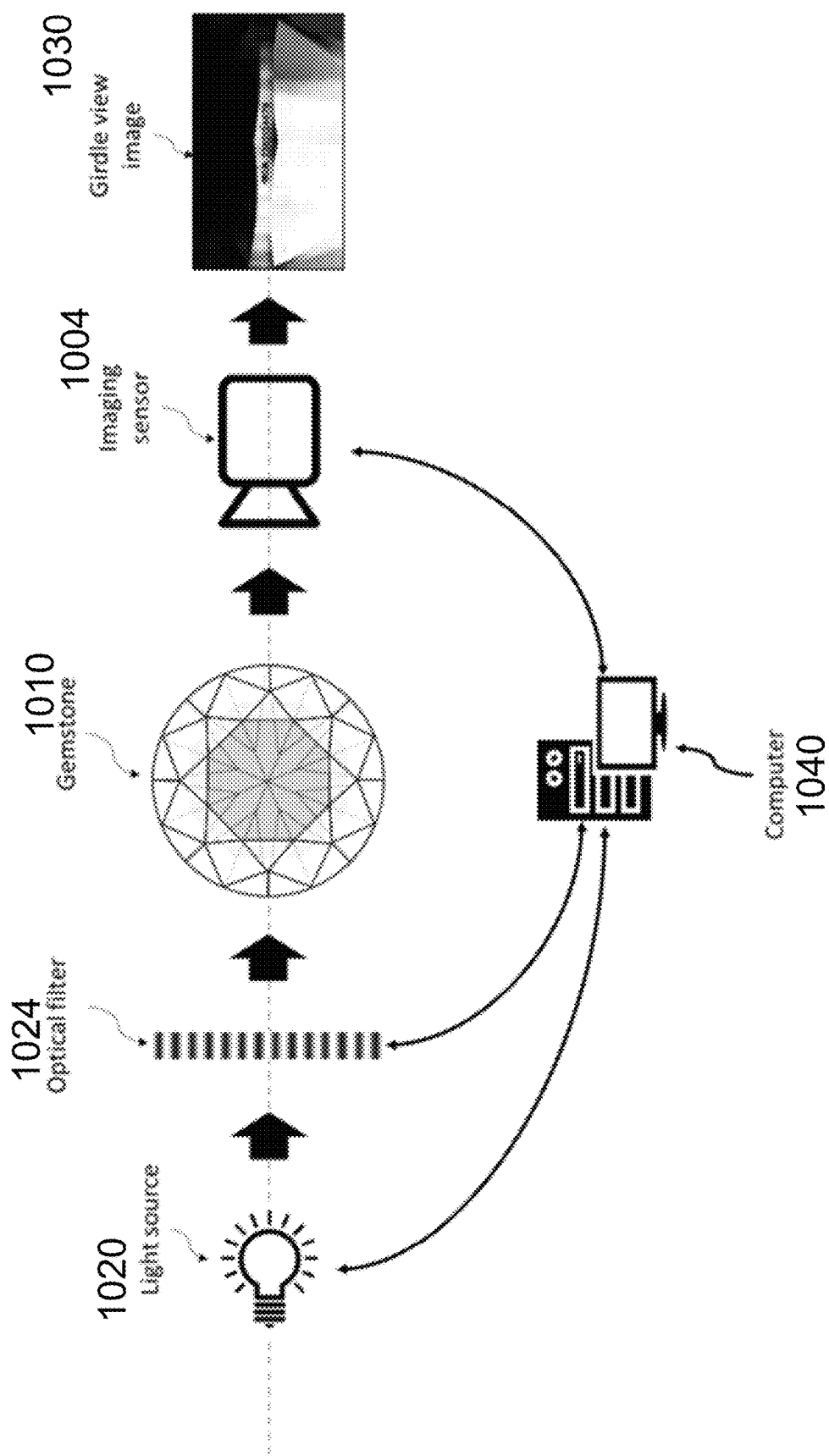
FIG. 10 is an illustration of an example hardware arrangements using certain aspects described herein.

FIG. 10 shows an example schematic of a transmission mode gemstone imaging system configured to verify a gemstone at girdle view or side-on view. As in FIG. 9 the components may be arranged in any orientation so long as their relative order is maintained as shown in FIG. 10. The left to right orientation of the light 1020 then filter 1024 then sample 1010 then imaging sensor camera 1004 is not intended to be limiting and could be oriented up and down, right to left, or any other orientation.

In the example, the light source 1020 includes an optical filter 1024 as described herein. The gemstone being imaged 1010 has one side of the girdle toward the light 1020 and the other side of the girdle toward the imaging sensor 1004 or digital camera. In such a way, the computer system 1040 (also described in FIGS. 19 and 20) may be in communication with the light 1020, optical filter 1024 display to change displays, and digital camera 1004 and can control all aspects of the imaging process, including but not limited to light on/off, light intensity 1020, light color 1020 light wavelengths 1020, which optical filter is used 1024, when the camera captures an image 1004, how many images are captured by the camera 1004, etc. The ultimate image captured in this arrangement of FIG. 10 is a girdle side image 1030.

Figure 11:
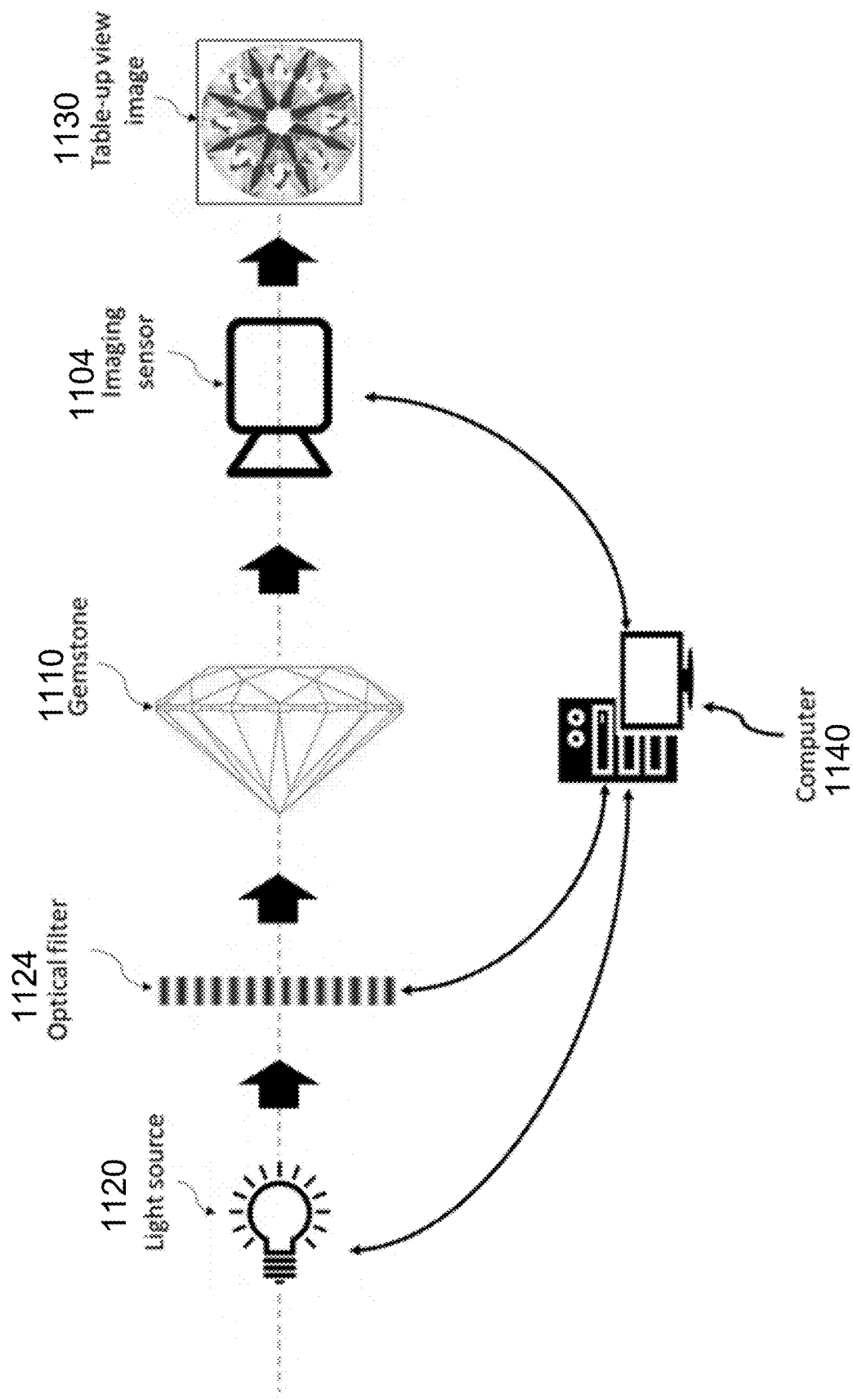
FIG. 11 is an illustration of an example hardware arrangements using certain aspects described herein.

FIG. 11 shows an example schematic of a transmission mode gemstone imaging system configured to verify a gemstone 1110 at table-up view toward the camera and culet toward the light source. As in FIGS. 9 and 10, the components may be arranged in any orientation so long as their relative order is maintained as shown in FIG. 11. The left to right orientation of the light 1120 then filter 1124 then sample 1110 then imaging sensor camera 1104 is not intended to be limiting and could be oriented up and down, right to left, or any other orientation.

In the example, the light source 1120 includes an optical filter 1124 as described herein. The gemstone being imaged 1110 has the culet side toward the light 1120 and table side toward the imaging sensor 1104 or digital camera. In such a way, the computer system 1140 (also described in FIGS. 19 and 20) may be in communication with the light 1120, optical filter 1124 display to change displays, and digital camera 1104 and can control all aspects of the imaging process, including but not limited to light on/off, light intensity 1120, light color 1120 light wavelengths 1120, which optical filter is used 1124, when the camera captures an image 1104, how many images are captured by the camera 1104, etc. The ultimate image captured in this arrangement of FIG. 11 is a table up image 1130.

Example Hardware Using Reflectance Arrangements

Figure 12:
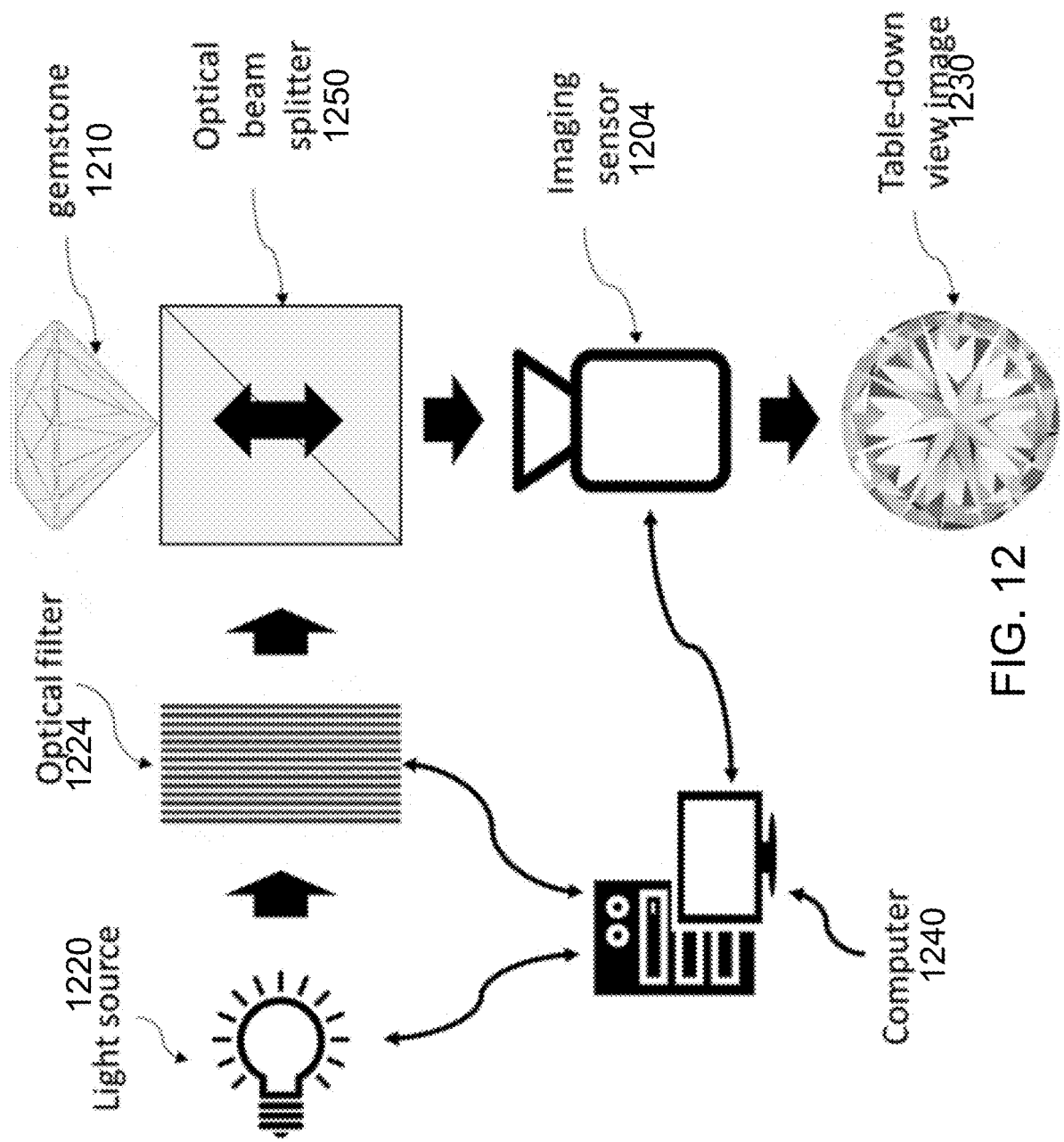
FIG. 12 is an illustration of an example hardware arrangements using certain aspects described herein.

FIG. 12 shows an example schematic of a reflection mode gemstone imaging system configured to verify a gemstone 1210 at table-up view with the culet toward the camera 1204. Such reflectance examples allow for the light source 1220 and camera 1204 to be placed in different orientations than those described in FIGS. 9, 10 and/or 11, so that the light 1220 may pass through and reflect from a dichroic beam splitter 1250 while the imaging camera 1204 may capture images through the dichroic beam splitter 1250. In such an way, the components such as light source 1220 and camera 1204 may be in different orientations, where those of the FIGS. 9, 10 and/or 11 are impractical or not desired. One such advantage may be illumination from the same direction as the images are captured, instead of a rear illumination arrangement.

Other advantages to a reflectance arrangement may include that the optical alignment is simple for a user to align the gemstone and/or such an arrangement is also well suited for other imaging modalities such as bright-field and florescent microscopy.

In the example, the light source 1220 includes an optical filter 1224 as described herein. The gemstone being imaged 1210 has the culet side toward the beam splitter 1250 and thereby both the light 1220 and the imaging sensor 1204 or digital camera. In such a way, the computer system 1240 (also described in FIGS. 19 and 20) may be in communication with the light 1220, optical filter 1224 display to change displays, and digital camera 1204 and can control all aspects of the imaging process, including but not limited to light on/off, light intensity 1220, light color 1220 light wavelengths 1220, which optical filter is used 1224, when the camera captures an image 1204, how many images are captured by the camera 1204, etc. The ultimate image captured in this arrangement of FIG. 12 is a table down image 1230 just like FIG. 9.

Figure 13:
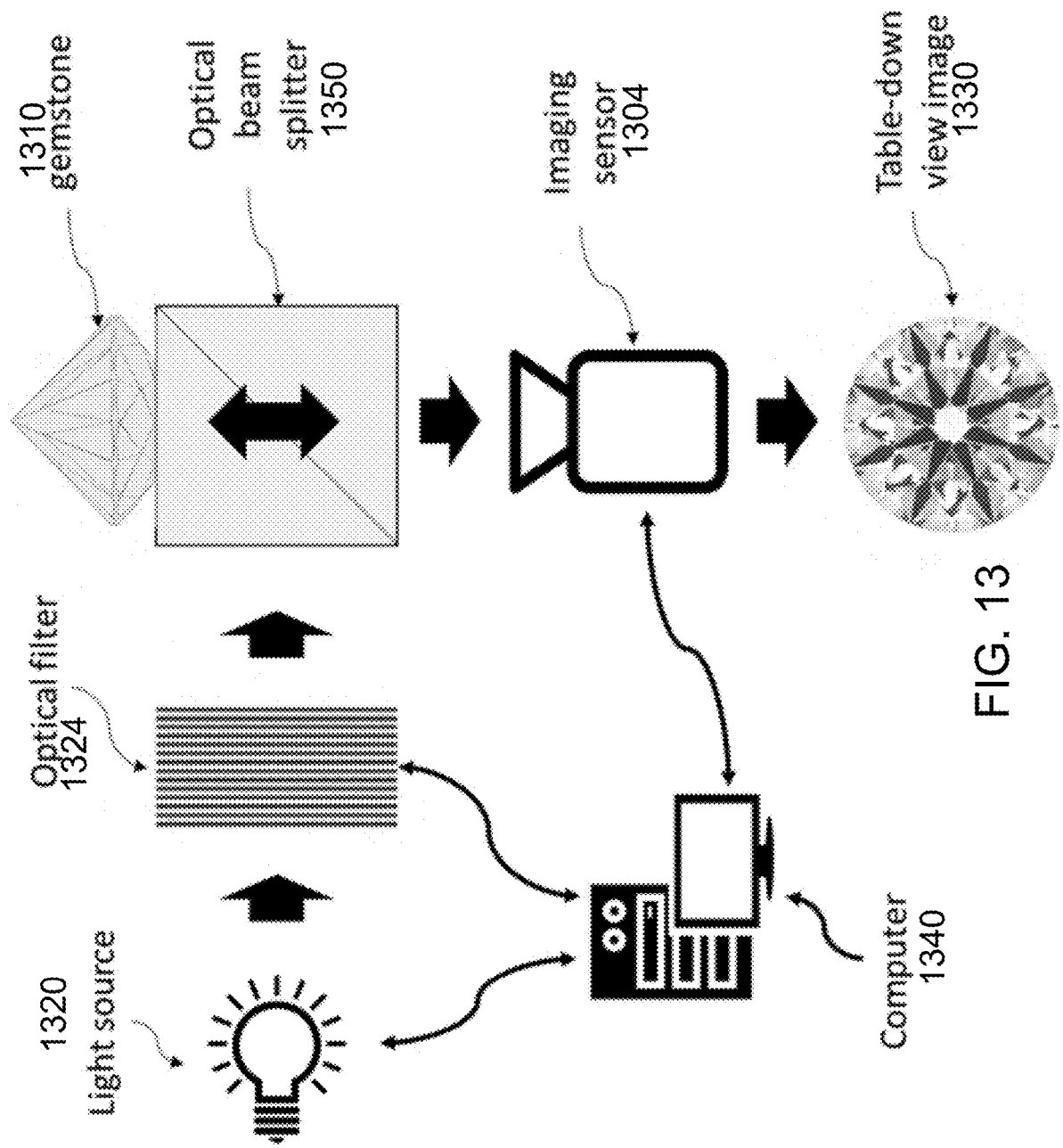
FIG. 13 is an illustration of an example hardware arrangements using certain aspects described herein.

FIG. 13 shows an example schematic of a reflection mode gemstone imaging system configured to verify a gemstone at table-down view. As in Figures. above the components may be arranged in any orientation so long as their relative order is maintained as shown in FIG. 13. The orientation of the light 1320 then filter 1324 then sample 1310, imaging sensor camera 1304 is not intended to be limiting and could be oriented up and down, right to left, or any other orientation.

FIG. 13 shows an example schematic of a reflection mode gemstone imaging system configured to verify a gemstone 1310 at table-up view with the table toward the camera 1304. Such reflectance examples allow for the light source 1320 and camera 1304 to be placed in different orientations than those described in FIGS. 9, 10 and/or 11, so that the light 1320 may pass through and reflect from a dichroic beam splitter 1350 while the imaging camera 1304 may capture images through the dichroic beam splitter 1350. In such an way, the light source 1320 and camera 1304 may be in different orientations, where those of the FIGS. 9, 10 and/or 11 are impractical or not desired. One such advantage may be illumination from the same direction as the images are captured, instead of a rear illumination arrangement.

Other advantages to a reflectance arrangement may include that the optical alignment is simple to align the gemstone and/or such an arrangement is also well suited for other imaging modalities such as bright-field and florescent microscopy.

In the example, the light source 1320 includes an optical filter 1324 as described herein. The gemstone being imaged 1310 has the table side toward the beam splitter 1350 and thereby both the light 1320 and the imaging sensor 1304 or digital camera. In such a way, the computer system 1340 (also described in FIGS. 19 and 20) may be in communication with the light 1320, optical filter 1324 display to change displays, and digital camera 1304 and can control all aspects of the imaging process, including but not limited to light on/off, light intensity 1320, light color 1320 light wavelengths 1320, which optical filter is used 1324, when the camera captures an image 1304, how many images are captured by the camera 1304, etc.

The ultimate image captured in this arrangement of FIG. 13 is a table up image 1330 just like FIG. 10.

Example Method Steps of Inscribing and Capturing Images

Figure 14:
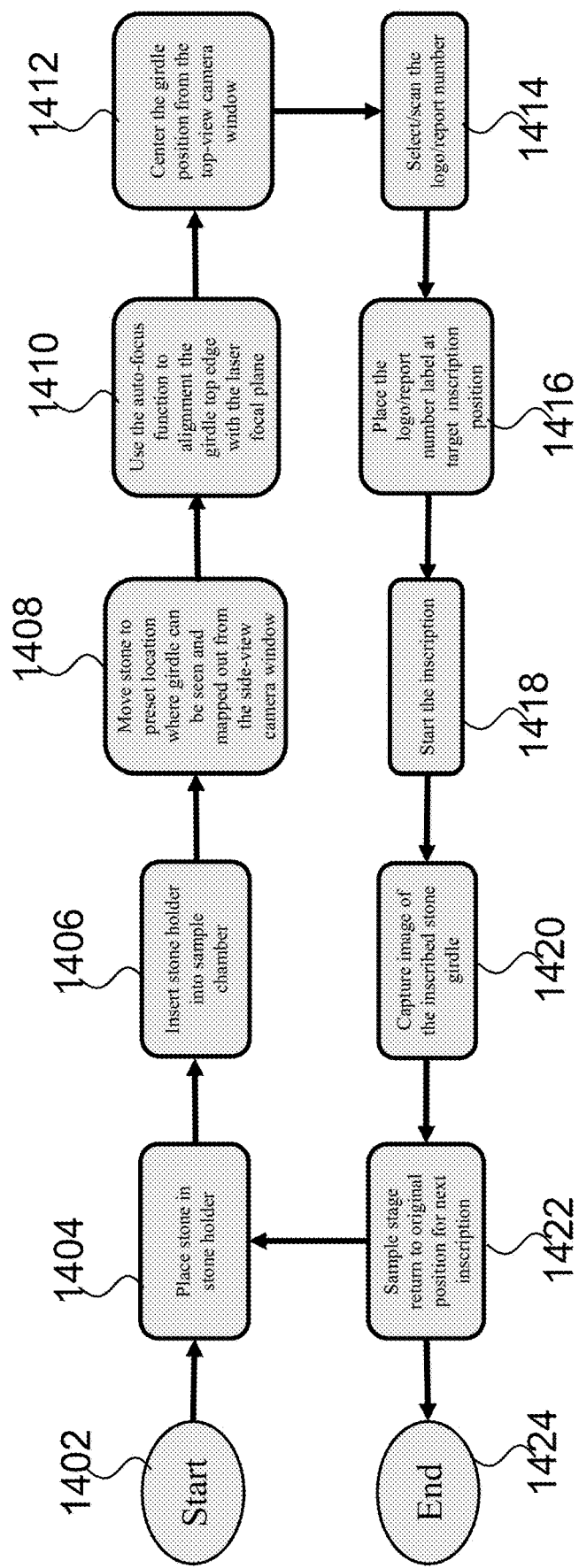
FIG. 14 is an example flow chart of certain aspects described herein.

FIG. 14 shows example steps that may be taken to utilize the holders of example FIG. 8 and the setup systems of FIGS. 7, 9, 10, 11, 12, and/or 13 alone or in any combination to inscribe a stone and capture a first image of the inscribed stone, for later comparison as described herein.

FIG. 14 explains that to start 1402, the stone is placed in the holder 1404 (See FIG. 8) then the stone holder is inserted into the sample chamber 1406. Next, the stone may be moved to a preset location where the stone girdle can be seen by the imaging system and mapped from the side view (for a girdle inscription) 1408. Next, the auto focus function may be utilized 1410 to align the girdle top edge with a laser focal plane. Next, center of the girdle position from the top view camera window 1412. Then, Select or scan the logo or report number on the stone 1414. The logo or report number label may be placed at the target inscription position 1416 and the inscription may be started 1418. Once inscribed, the image system may capture an image of the stone and inscription 1420 and stored for future comparison use. Then the sample stage may be returned to an original position for the next inscription 1422 which may revert back to another placement of another stone in the holder 1404 or end 1424.

Verification Method Examples

Figure 15:
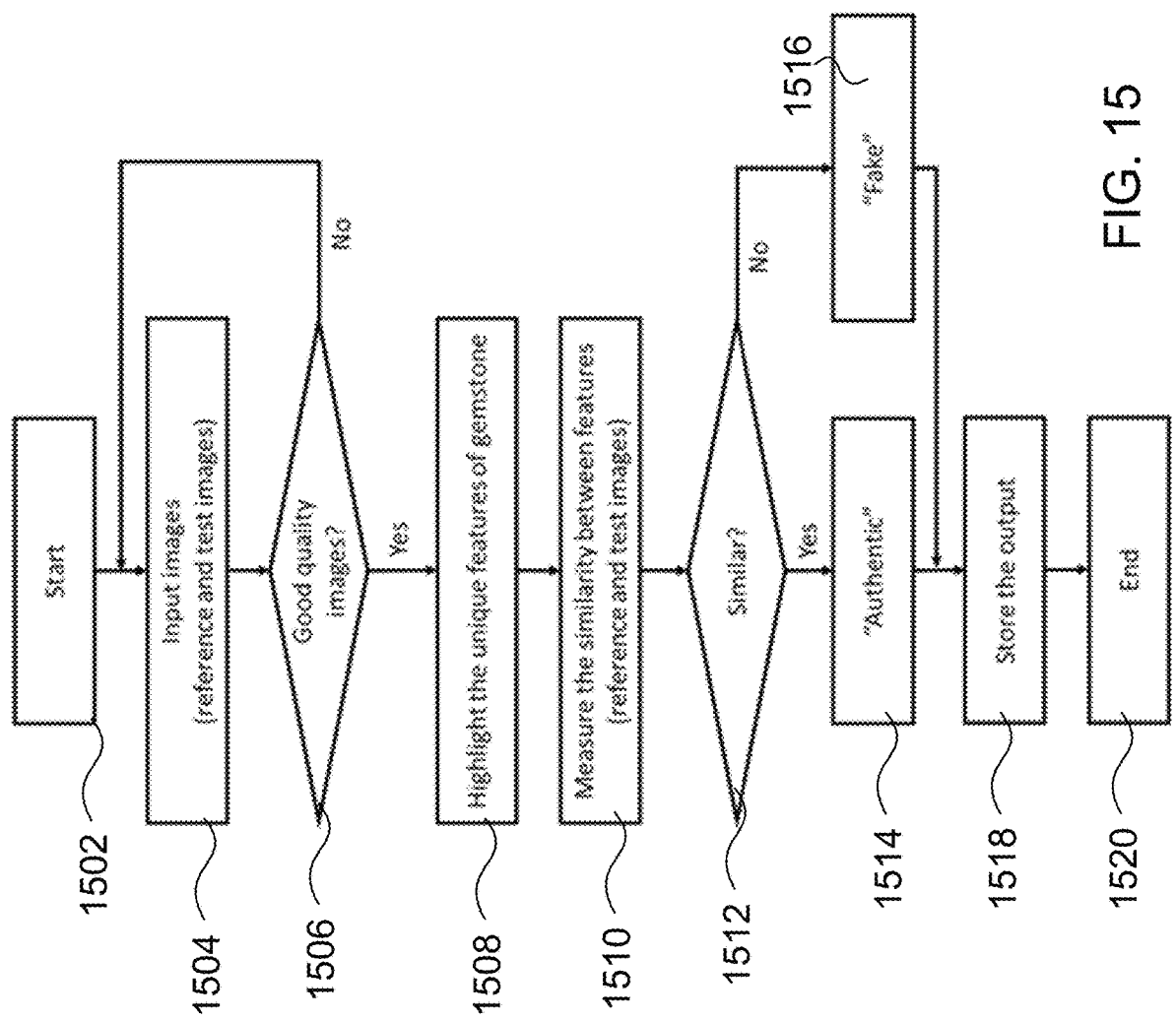
FIG. 15 is an illustration of an example flow chart using certain aspects described herein.

FIG. 15 shows method steps to capture images and compare images for matching using the systems and methods described herein.

Figure 16:
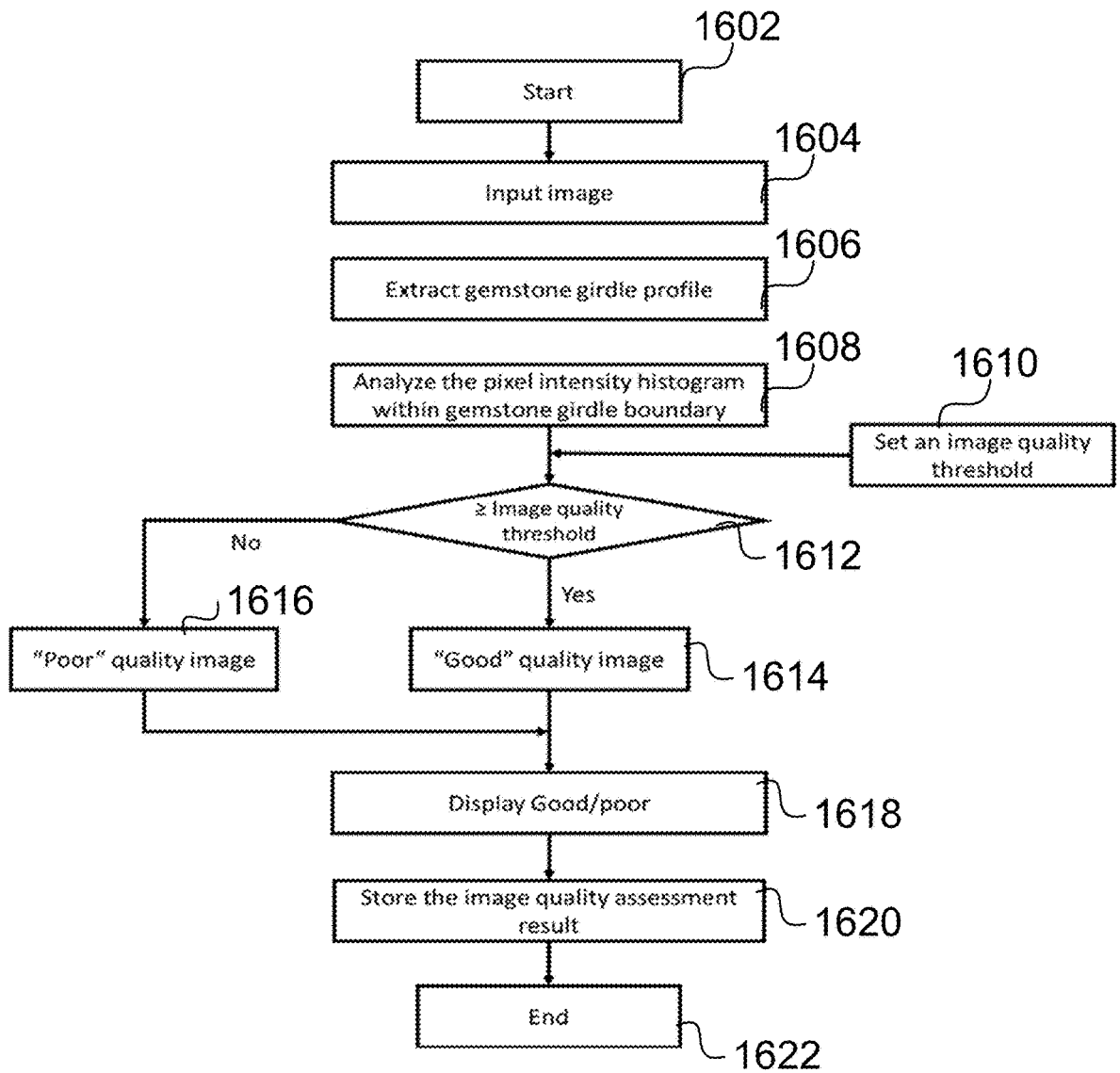
FIG. 16 is an example flow chart for image capture according to aspects described herein.

FIG. 15 shows an example flow chart to illustrate the workflow of gemstone verification methods in conjunction with gemstone imaging systems described here including computer and network systems described. First, in the example, 1502 both reference and test input images are acquired from a gemstone digital imaging system 1504 using the systems and methods described herein. The system may then analyze image quality automatically to filter out any poor quality images 1506, which may potentially result in verification failure in the following steps. Such a step of filtering poor quality images may include automated image quality assessment software, which is based on both a classical image processing method and an AI model. Some examples may employ any combination of edge detection, noise detection, image comparison to stored examples, and/or image recognition. FIG. 16 shows an example flow chart walking through the example steps the computer systems described herein may take in order to determine whether an image is acceptable or requires another image for comparison. First 1602, the image is input into the system 1604. Such an image may be taken from the system described herein, or by any other digital image capture system or method. In some examples, the image is of a gemstone girdle and any associated indicia marked thereon. Next, the computer may extract the gemstone girdle profile from the image 1606. Next, the computer may create and then analyze a pixel intensity histogram of the digital image within the defined gemstone girdle boundary already determined 1608. Next, the system may send an image quality threshold 1610. Such a threshold may be predetermined by the system, loaded manually, or learned over time using AI and/or Machine learning algorithms. Such a threshold may use any number of analysis of the pixels in the image to determine if it is poor or good including but not limited to sharpness of the image, color change between pixels that are next to one another, distance between pixel levels of neighboring pixels, rise distance of pixels next to one another in the image, resolution threshold analysis of pixels in the image, edge detection algorithms for any detected etched or engraved characters, noise detected on image or around detected characters, or any other kind of focus or image sharpness determination. Such corresponding thresholds may be established by a user or the system or artificial intelligence and may be moved, changed, or adjusted. In some examples, the thresholds may be moved depending on history of matches fed back into a model that statistically predicts matches and errors of matches. Next, if the systems and methods determine that the image quality threshold is met or exceeded 1612, then the image is deemed good quality 1614, but if not, the image is deemed poor quality 1616. The systems and methods may then cause display of the determination good or poor 1618 and then store the image and correlated quality assessment result 1620 before ending 1622.

Systems and methods may also be used to determine image quality assessment using a classical image processing method, alone or in combination as described. In some examples, artificial intelligence systems and methods may be trained and used to determine poor quality images, together with any or none of the following other example tools such as but not limited to edge detection algorithms, noise detection, image comparison, and/or image recognition.

Next, unique gemstone features from any good quality image pairs (reference and test images) in addition to corresponding meta-data for the images can be highlighted 1508 with newly developed gemstone verification method. Highlighting unique features of a gemstone may include but are not limited to color, inscription, facets, inclusion, etc. For example, the systems and methods her may be able to extract them with optical character recognition (OCR) for inscription, AI model for facets and/or color analysis, and/or AI model to relate with other identifiers such as internal inclusions, gemstone cut type, size, weight, etc. alone or in any combination of the above.

In the gemstone verification method, the unique features of each gemstone image may be extracted using an image processing algorithm, which may, in some examples, utilize both image processing methods and artificial intelligence (AI) algorithms. Artificial Intelligence (AI) is a broad term which includes both statistical models (k-means clustering, classification, etc.), neural network-based approaches, and reinforcement learning, and Machine Learning (ML) is a subfield of AI which includes the training of models based on input data from outside sources. These features may then be compared to reference test images 1510. Additionally, or alternatively, the meta-data corresponding to each image may include information other than gemstone image such as shape, size, color, cut type, girdle condition, wire frame of gemstone, properties, origin, owner, history, natural/synthetic/processed, identification number, alone or in any combination or any other information about the gemstone.

In such examples, the similarity of the paired unique gemstone features can then be measured 1512 automatically by the gemstone verification algorithm.

When the resulting similarity assessed by the above-mentioned methods is relatively high, as compared to a predetermined threshold, the test gemstone can be considered to meet the threshold and deemed or labeled as authentic 1514. In an example contrary analysis, when the resulting similarity is relatively low (or poor) as compared to a predetermined threshold, the test gemstone can be considered to miss the threshold and deemed or labeled as fake or spurious or any other indicator 1516. In such examples, those images that do not match the reference gemstone image are deemed to miss the authenticity threshold and thereby labeled as fake. Lastly, the outcome of gemstone verification including authenticity, request date and time, request site, requester's name, or any other data alone or in combination, may be collected and stored 1518 on a designated database for later use, thus ending the example process 1520.

Figure 17A:
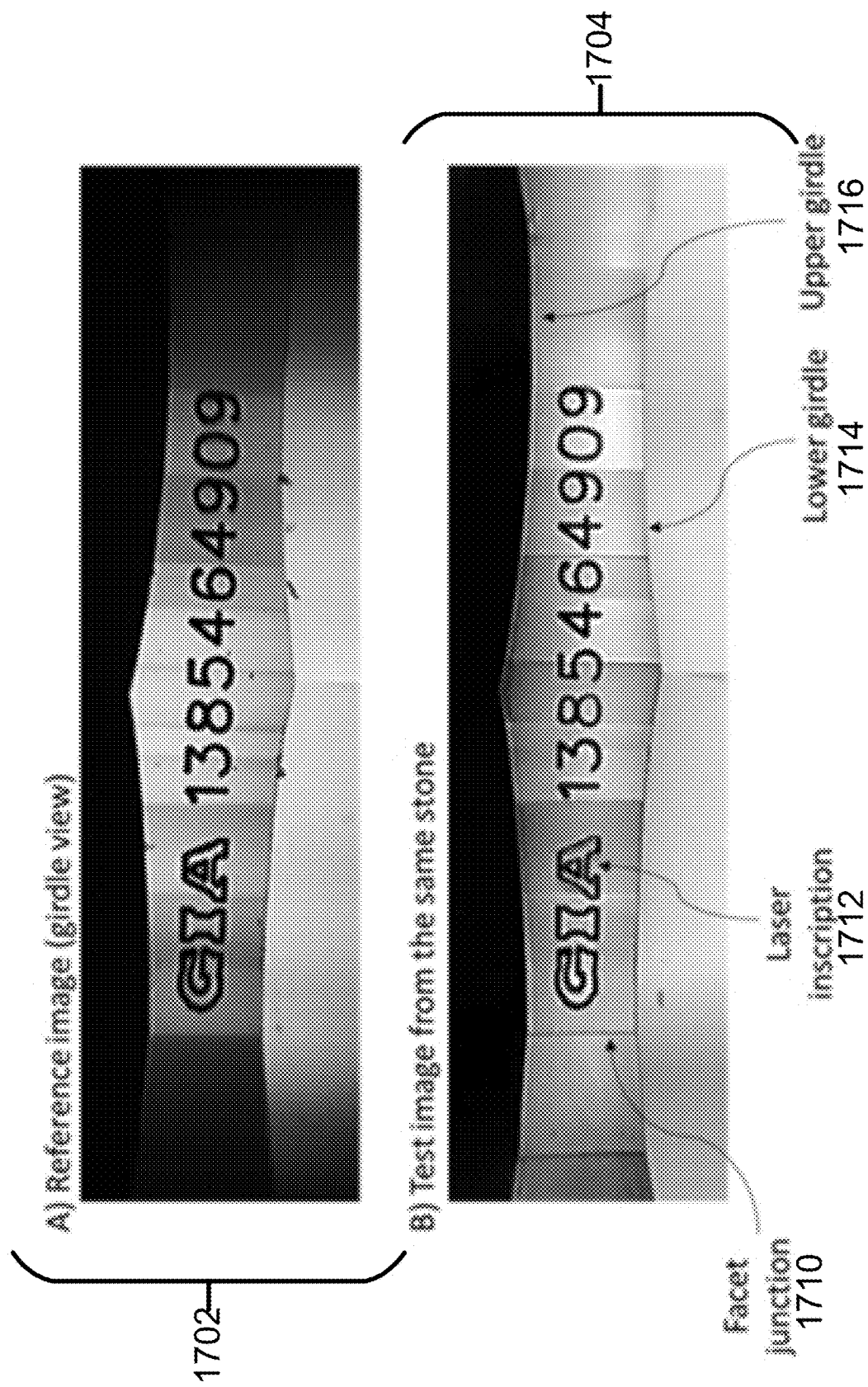
FIGS. 17A and 17B are images of example inscription arrangements using certain aspects described herein.

FIG. 17A shows an example of gemstone verification as described herein, showing two images of a detail of the girdle of the stones and the inscription, from an identical gemstone. Aspects in the reference image 1702 which is first taken and stored at an earlier time, for example, when the gemstone inscription was made, are compared to a second recent image 1704 of a stone from a remote location, in hopes of verifying the stone in the second instance 1704 to the reference stone images 1702. The method steps of FIG. 15 may be applied as described. In this example of FIG. 17A, the outcome from the gemstone verification algorithm is authentic because the similarity of girdle profile and facet junctions are highly similar between two images. For example, the facet junctions 1710 match in distance from the inscriptions 1712. Further, the lower girdle 1714 and upper girdle 1716 appear in line with the inscriptions 1712 and facet junctions 1710. By cross comparing all of these different points, the system may deduce or determine whether there is a match or not between the new images 1704 submitted from a remote source, and those stored on the system as the reference image 1702.

Figure 17B:
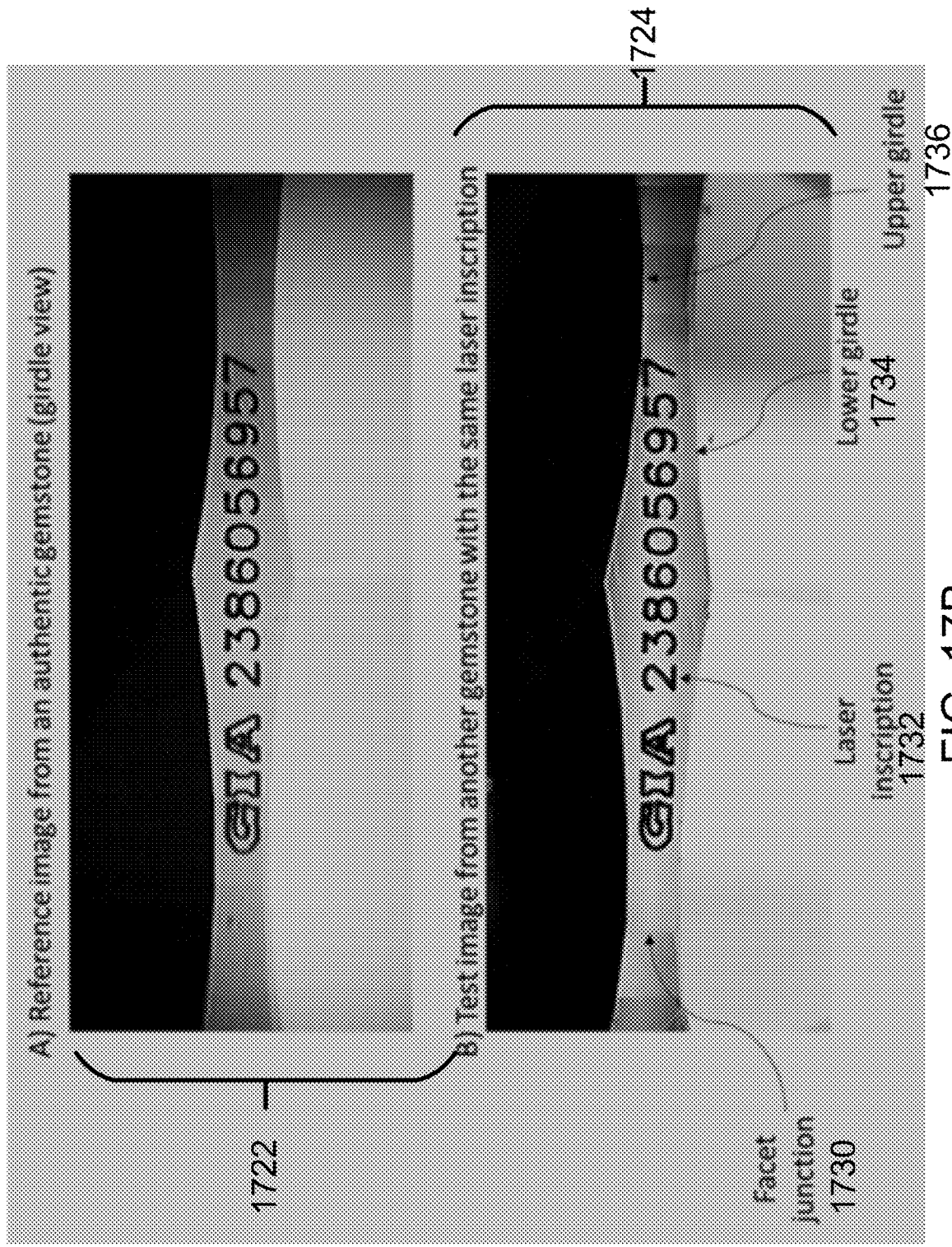

FIG. 17B shows an example gemstone verification with two images from different gemstones but the same inscription characters. In this example, aspects in the reference image 1722 stored in the system with the corresponding inscription are compared against a recently taken, new image 1724 possibly from a remote location, and submitted for comparison and verification.

In the example of FIG. 17B, the outcome from the gemstone verification method as described in FIG. 15 is that the submitted image is fake because the similarity of the submitted image 1724 and the reference image 1722 is not close enough. For example, the girdle profile of the lower girdle 1734 and upper girdle 1736 do not line up with the laser inscription 1732 characters in the same way they do in the reference image 1722. Further, the facet junctions 1730 in the submitted image 1724 are poorly matched with those in the reference image 1722. Thus, even though both gemstones 1722 and 1724 are a round brilliant cut, these images show that the details of the variables of facet junctions, laser inscription characters, and girdle profiles do not match.

Artificial Intelligence Examples

Artificial intelligence, machine learning, and other similar methods may be employed to help the image comparison examples described herein, including in FIG. 15. Briefly, AI is a very broad term, which includes both statistical method (k-means clustering, classification, etc.) neural network-based approaches, and reinforcement learning. Such AI or machine learning may use algorithms that analyze pixelated digital images and determine aspects of the images useful for comparing, while discounting aspects that are not useful for comparing. By so doing, AI algorithms may be able to more accurately match images. For example, images of the same gemstone taken under slightly different lighting conditions may exhibit certain aspects that appear different, but if the AI algorithms are trained to discount such lighting characteristics and instead focus on unchangeable aspects such as shapes, inclusions, facets, colors, and other characteristics, better matches may be made. AI algorithms may be trained using images of the same gemstone and images of different gemstones and identified as such during training.

For example, a common AI system used to extract the unique gemstone features may be but is not limited to, UNET. In such examples, UNET may be trained to extract a targeted feature out of various other features on a given image of a gemstone. Additionally or alternatively, the total training dataset required to make the extraction of targeted features may be reduced significantly by a transfer learning approach.

For example, the similarity of the unique features can be measured by comparing both features geometrically and/or statistically. In some examples, an AI based algorithm can be considered for the similarity assessment because it tends to be robust in performance. In one non-limiting example, Siamese neural network and One-shot learning may be used for face recognition in digital images. One example advantage of these AI models is that it is not necessary to re-train the AI model for any new dataset and its performance can be acceptable. Another non-limiting alternative method in measuring similarity may be using computational data analysis techniques such as k-mean clustering, classification, correlation, and/or regression analysis.

User Interface Examples

Figure 18A:
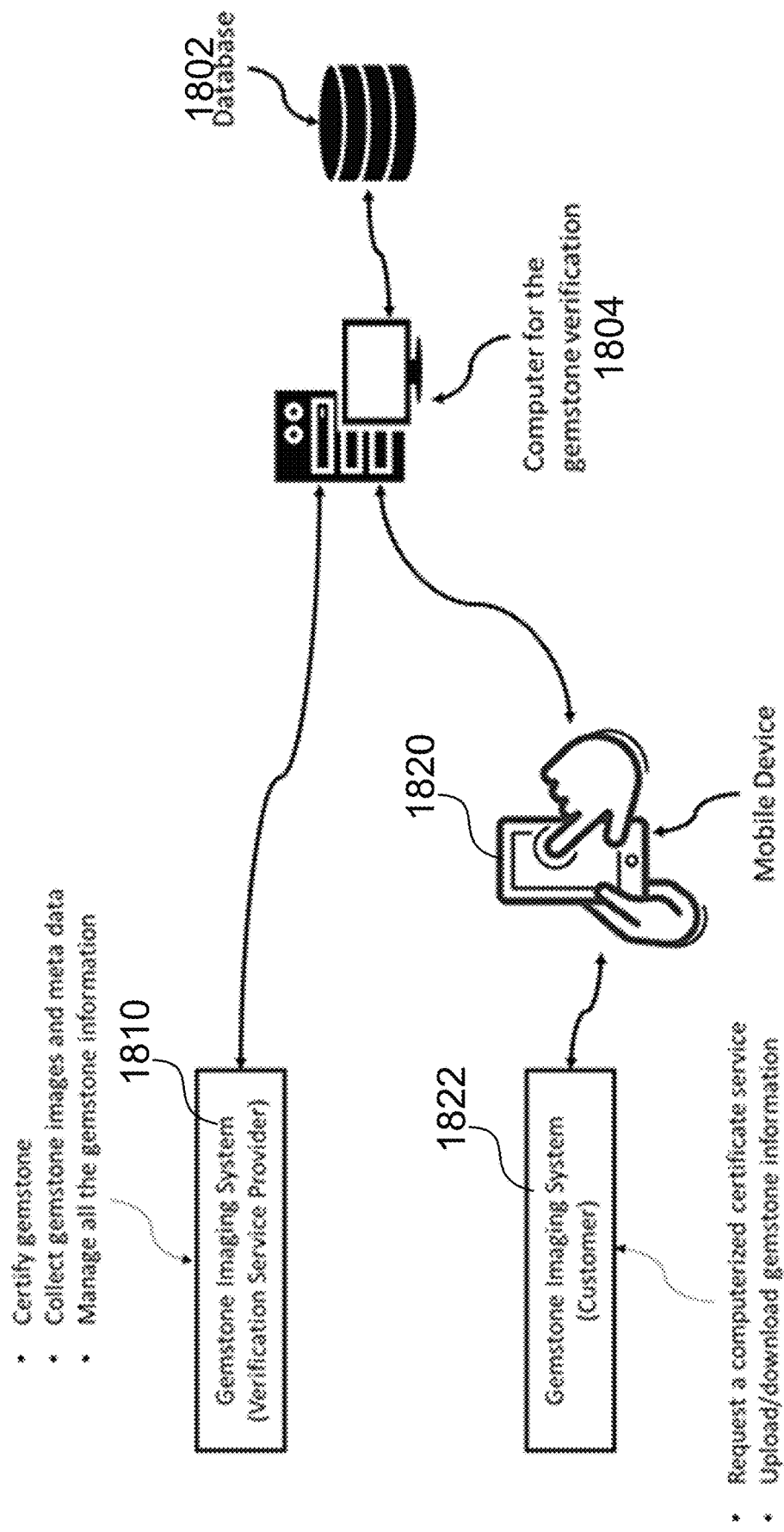
FIGS. 18A, 18B and 18C show user interface examples according to certain aspects described herein.
Figure 18B:
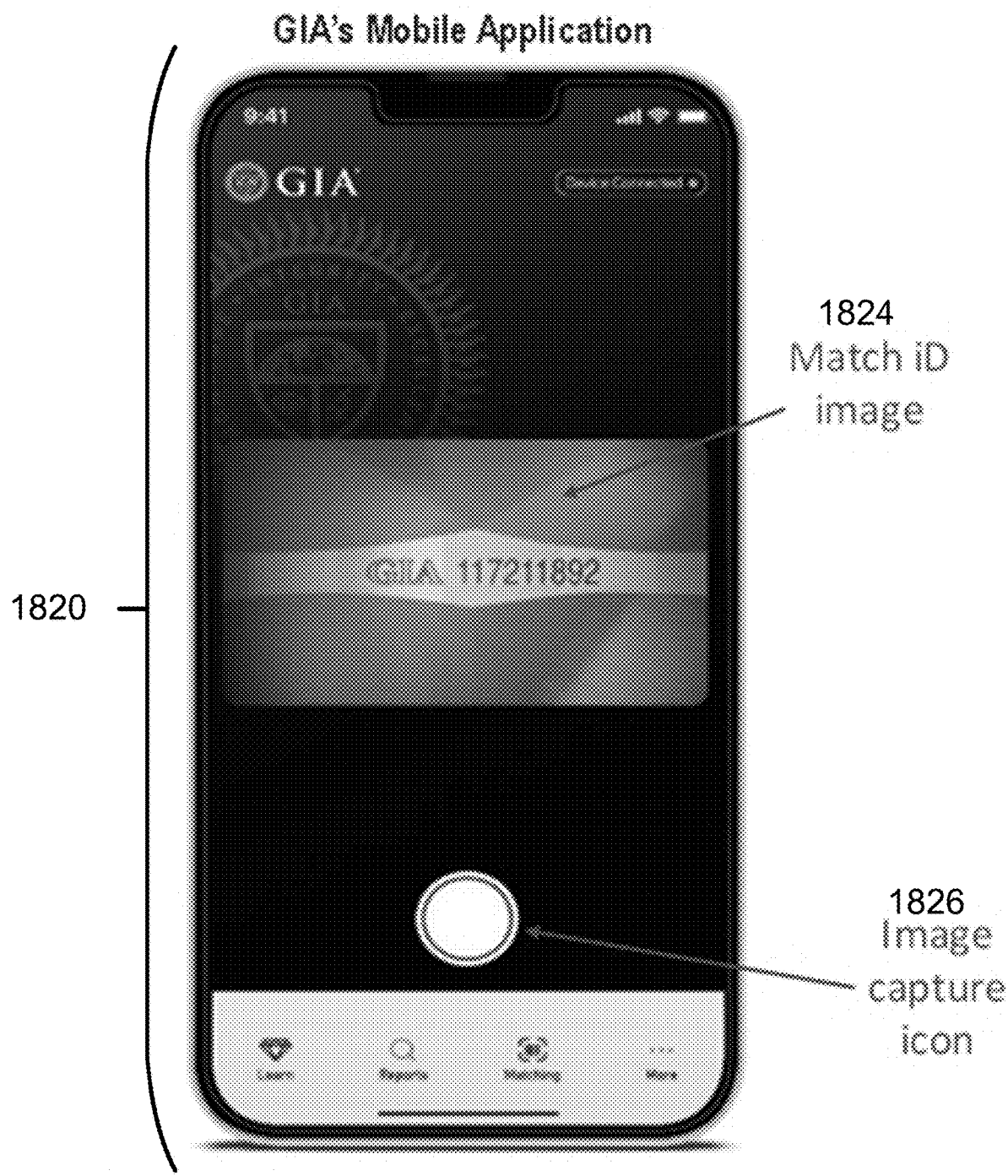
Figure 18C:
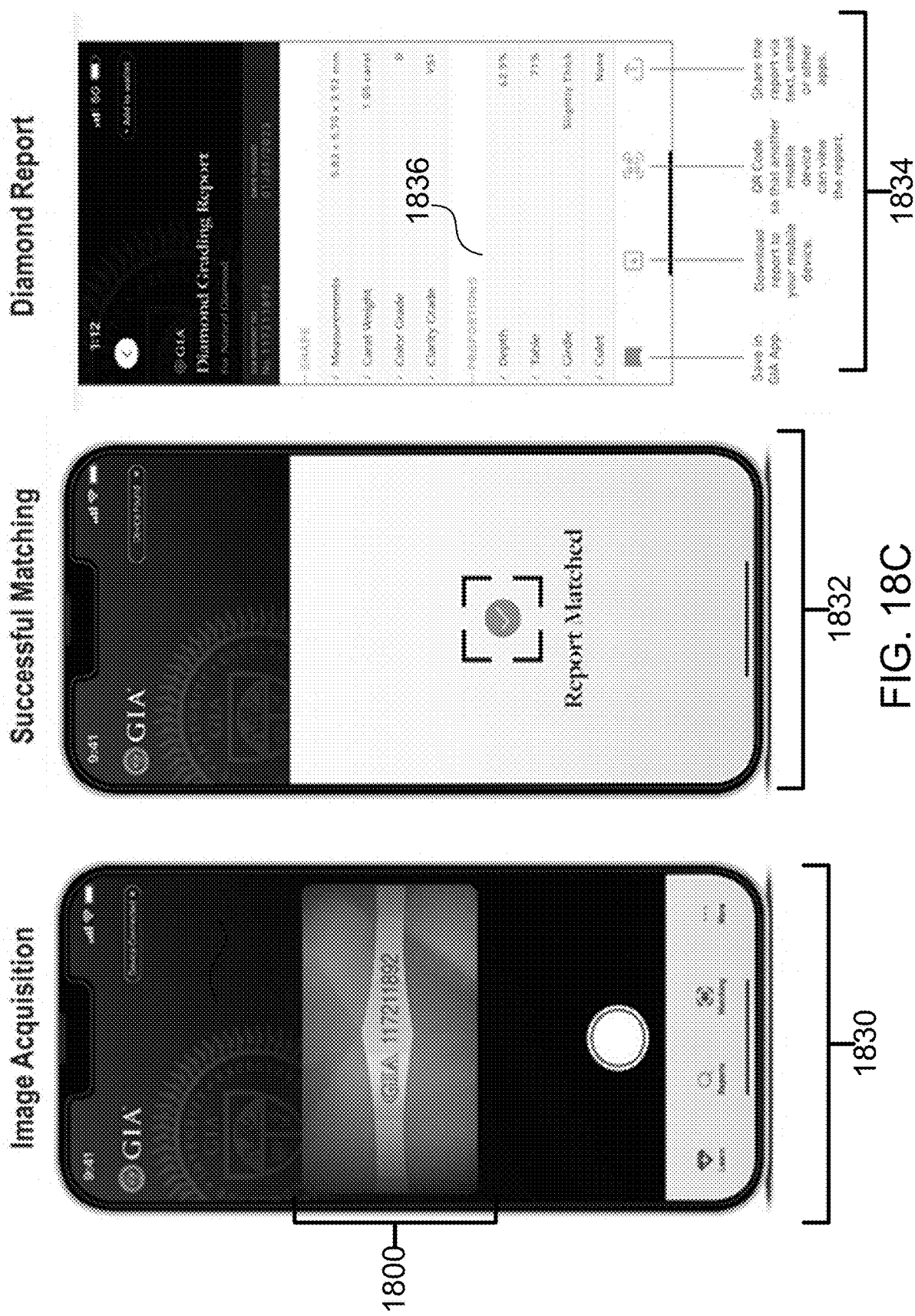

FIGS. 18A, 18B and 18C show examples of using the system and methods described here, by an end user with a mobile device. FIG. 18A shows a back-end database 1802 in communication with a computer system with a processor and memory 1804 that is able to access data in the database 1802 and compare using programmed algorithms as described herein. The service provider gemstone imaging system 1810 is also shown in communication with the computer 1804. The imaging system for the service provider 1810 may be the same entity that marks the gemstones with an identifier and can verify the specific physical properties of the gemstone and match with the original identifier. This information may be first sent from the original imaging system 1810 to the computer 1804 and stored on the database 1802. These original images may later be used to compare gemstones at a later time for verification and/or identification purposes.

Also shown is a customer facing imaging system 1822 could be any number of customer facing systems as shown in FIGS. 6A, 6B and elsewhere able to illuminate any target gemstone as described and capture digital images of the gemstone including in some examples, the corresponding identifier as described herein, for example FIG. 1. It is these later captured images that are compared by the back-end computer 1804 against the previously stored images 1802 for comparison and/or identification. A mobile device smartphone 1820 or other computer with a software application running on it may be used to receive image data from the customer facing imaging system 1822 and send to the back-end computer 1804 for comparison with the images stored in the data storage 1802. The mobile device 1820 may also receive matching conclusions and results to display to a consumer.

FIG. 18B shows an example mobile device 1820 with a screen showing the captured image 1824 from the customer facing image system 1822. In some examples, the mobile device may also include software to capture the image 1826 and send the image capture instruction to the customer facing image capture system 1822. In such examples, then the mobile device software 1820 may send the captured image to the back-end computer 1804 for comparison.

FIG. 18C shows examples of the mobile device image capture screen 1830, and another screen example where the back-end computer system 1804 has indicated an image match 1832. Not shown may be a screen display indicating when the back-end computer system 1804 detects no match of the captured image and previously stored image. In the example of the image match 1832, the mobile device software may display any of the stored information that corresponds to the matched images 1836. For example, a grading report may be displayed for the gemstone that matched the image with the previously stored back-end image data 1802. Any kind of data could be stored and correlated to an image for matching and then displaying to the mobile device or other screen displays for customers.

Example Network

FIG. 19 shows an example networked diagram of example hardware as described here, that may be used to practice the methods described herein. In such an example, it is possible to place a customer facing digital imaging system 1904 that is customized to the methods described herein to capture images of a sample gemstone for verification/authentication purposes. Such a digital imaging system 1904 may include lights, filters, cameras, and/or any other components to capture images of gemstone that are in need of authenticating from clients or sales staff.

In some examples, the systems described herein may be packaged into a table or desk top arrangement 1904 and placed in a consumer facing off-site location such as a jewelry store or other off-site lab. As described herein, the computer systems such as those in FIGS. 9, 10, 11, 12, 13 and/or 20 may be in communication with a back-end system 1920 configured to analyze the images, cause storage of the images, compare images, post produce images, and/or any other computer related actions on the images.

After capturing the required number of images using the image capture system 1904, under the requested filtered lighting environments as described here, the image data may be sent by a network to a computer 1902 and computer storage, such as a server computer or back-end computer system 1920 (see FIG. 20). In this example, one, two or more input images taken by imaging system 1904, in some examples in conjunctions with gemstone meta-data, may be uploaded to the computer 1902 or back-end computers 1920 from the imaging system 1904. The back-end data storage and servers 1920 may store reference images of gemstones taken previously and stored for comparison purposes as described herein. Other data such as but not limited to images and meta-data as a reference information may also be stored locally 1902 and/or on the back end 1920. In some examples, a gemstone certificate may be generated that includes information on the gemstone and any or all identifying information for it, stored and correlated to the images captured, sent to various customers or vendors, and thereby memorialize any information stored on such certificate.

A display or local computing system 1906 may be in communication with the imaging system 1904 and/or the computing system 1902. Such an arrangement 1906 may be used to operate the imaging system 1904, review and input identifying information about a gemstone under evaluation, send and receive data of the image data from the cameras 1904, along with any meta data, time/date stamps, geo location information, names, serial numbers, grade report numbers, or any other information which may be used to identify the gemstone under analysis.

In some examples, the computers may be in communication with a network such as the Internet 1910 and thereby to other back-end resources such as computers 1920 and storage through land lines 1944, cellular 1940 and/or WiFi 1942 type example communication methods.

Upon capture of a gemstone under new analysis by the computing systems 1940, 1902, the data may be sent to the back-end servers 1920 for a match, or shared on the local systems 1902 to conduct the matching steps as described herein. In some examples, applications on the local computer 1902 and/or mobile device 1906 may be used to complete the matching, and/or receive information regarding the matching determinations from the back-end servers 1920.

When all the comparisons are complete, the systems may then verify the authenticity of the gemstone information with the information previously stored by the help of the novel gemstone verification algorithm(s). If the outcome of gemstone verification is authentic, the computer systems can authorize re-issuing the proper gemstone certificate previously stored on the system 1920, 1902. In some examples, the systems may store information regarding previous transactions of the gemstone and report such information in a chain-of-title history report. In some examples, a blockchain may be used to store chain-of-title information for a gemstone using the identification information as described herein.

Example Computer Devices

FIG. 20 shows an example computing device 2000 which may be used in the systems and methods described herein. In the example computer 2000 a CPU or processor 2010 is in communication by a bus or other communication 2012 with a user interface 2014. The user interface includes an example input device such as a keyboard, mouse, touchscreen, button, joystick, or other user input device(s). The user interface 2014 also includes a display device 2018 such as a screen that may display a user interface such as the example of FIG. 13 and an input device 2016 such as touch screen, mouse, keyboard, joystick, or other manual input devices. The computing device 2000 shown in FIG. 20 also includes a network interface 2020 which is in communication with the CPU 2020 and other components. The network interface 2020 may allow the computing device 2000 to communicate with other computers, databases, networks, user devices, or any other computing capable devices. In some examples, alternatively or additionally, the method of communication may be through WiFi, cellular, Bluetooth Low Energy, wired communication, or any other kind of communication. In some examples, alternatively or additionally, the example computing device 2000 includes peripherals 2024 also in communication with the processor 2010. In some examples, alternatively or additionally, digital camera 2026. In some examples peripherals 2024 may include lights 2028 and/or filtered lights as disclosed. In some example computing device 2000, a memory 2022 is in communication with the processor 2010. In some examples, alternatively or additionally, this memory 2022 may include instructions to execute software such as an operating system 2032, network communications module 2034, other instructions 2036, applications 2038, applications to digitize images 2040, applications to process image pixels 2042, autofocus 2043, data storage 2058, data such as data tables 2060, transaction logs 2062, sample data 2064, inscription data 2070 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects include: memory devices, microcontrollers with memory (such as 8PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method comprising:
   by a computer with a processor and memory, the computer in communication with a networked comparison server computer, a digital camera and a structured, filtered light source,
   causing the light source illuminate gemstone in a holder, wherein the gemstone includes an inscription, and wherein the light source includes a structured filter;
   by the computer, receiving a digital image of the gemstone and at least one identifier for the gemstone;
   by the computer, retrieving at least one previously stored digital image and its identifier using the received identifier, wherein the previously stored image and its identifiers includes an inscription on a gemstone and its unique features;
   by the computer, comparing the received digital image of the gemstone and/or identifiers with the at least one previously stored digital image retrieved using the identifier(s),
   wherein the comparing the received digital image of the gemstone and/or identifier(s) with the at least one previously stored digital image retrieved using the identifier(s);
   if the comparison matches, indicating to a user interface, a match; and
   if the comparison does not match, indicating to the user interface, no match.

2. The method of claim 1 wherein the light source filter is a horizontal filter.

3. The method of claim 1 wherein the light source filter is a vertical filter.

4. The method of claim 1 wherein the light source filter is a grid filter.

5. The method of claim 1 wherein the light source filter is a circular filter.

6. The method of claim 1 wherein the light source filter is a square filter.

7. The method of claim 1 wherein the light source filter is in a particular shape correlated to a geometry of the gemstone.

8. The method of claim 1 wherein the structured, filtered light source includes lines with spacing and size and linewidth that is proportional to at least one of, a distance between the structured, filtered light source to the gemstone, a diameter of the gemstone, a spatial distance between facet junctions of the gemstone, and a height of the gemstone.

9. The method of claim 1 wherein the structured, filtered light source is an optical display/projector/monitor/LEDs.

10. The method of claim 1 wherein the digital camera and the light source are desk top units which are remote from the computer used for comparing with previously stored images.

11. The method of claim 1 wherein the digital camera and the structured, filtered light source are in a same mobile unit which are remote from the computer used for comparing with previously stored images.

12. The method of claim 1 wherein the digital camera and light source are directed along a same axis to the gemstone by a dichroic beam splitter.

13. The method of claim 1 wherein the digital camera and light source are directed at opposite sides of the gemstone to provide a back light image.

14. The method of claim 1 wherein the comparing the received digital image of the gemstone and/or identifier(s) with the at least one previously stored digital image retrieved using the identifier(s), includes comparing gemstone girdle profile in the images.

15. The method of claim 1 wherein the comparing the previously stored digital image of the gemstone and/or identifier(s) can be replaced with a newly acquired digital image of the same gemstone and/or identifier(s).

16. The method of claim 1 wherein the matching server generates a digital certificate/record of gemstone after a successful matching and the resulting digital certificate/record can be provided to a user(s).

17. The method of claim 1 wherein a thickness of lines in the structured, filtered light can be vary from 1 nm to 100 mm and a spacing of lines in the structured, filtered light can be vary from 1 nm to 100 mm.

18. The method of claim 1 wherein lines in the structured, filtered light have a sinusoidal gradation.

19. The method of claim 1 wherein lines in the structured, filtered light are binary without gradation.

* * * * *